INVENTORS
PAUL R. DROUILHET, JR.
JERRY L. HOLSINGER
BY Kenyon & Kenyon
ATTORNEYS $T = \frac{1}{3200}$ SEC.

INVENTORS
PAUL R. DROUILHET, JR.
JERRY L. HOLSINGER
Kenyon & Kenyon
ATTORNEYS

INVENTORS
PAUL R. DROUILHET, JR.
JERRY L. HOLSINGER
BY Kenyon & Kenyon
ATTORNEYS INVENTORS
PAUL R. DROUILHET, JR.
BY JERRY L. HOLSINGER
Kenyon & Kenyon
ATTORNEYS INVENTORS
PAUL R. DROUILHET, JR.
JERRY L. HOLSINGER
BY Kenyon & Kenyon
ATTORNEYS INVENTORS
PAUL R. DROUILHET, JR.
JERRY L. HOLSINGER
BY Kenyon & Kenyon
ATTORNEYS INVENTORS
PAUL R. DROUILHET, JR.
JERRY L. HOLSINGER
BY Kenyon & Kenyon
ATTORNEYS INVENTORS
PAUL R. DROUILHET, JR.
BY JERRY L. HOLSINGER
Kenyon & Kenyon
ATTORNEYS

3,444,468
DATA TRANSMISSION METHOD AND SYSTEM UTILIZING ADAPTIVE EQUALIZATION

Paul R. Drouilhet, Jr., Lexington, and Jerry L. Holsinger, Bedford, Mass., assignors to Massachusetts Institute of Technology, Cambridge, Mass., a corporation of Massachusetts Continuation of application Ser. No. 471,948, July 14, 1965. This application Oct. 20, 1965, Ser. No. 506,421
Int. Cl. H04b *1/12, 3/04*
U.S. Cl. 325—42 17 Claims

ABSTRACT OF THE DISCLOSURE

Equalization system for data that has been distorted by transmission. The adjustable gain factors of the equalizer are corrected on the basis of reducing each of a sequence of signals representative of the output errors of the equalizer by a uniform factor and applying the reduced values to the gain factors on a one to one basis. The equalizer is realized using analog or digital tapped delay lines. Adaptive equalization may be obtained by transmitting reference signals in the form of pseudonoise or other two level sequences with the data, which allows updating of the equalizer in the presence of data. Sampling in accordance with the nulls of an out-of-phase pilot tone eliminates problem tail distortion.

This application is a continuation of application Ser. No. 471,948, filed July 14, 1965, now abandoned.

This invention relates in general to data transmission systems and more particularly to high speed electrical pulse data transmission systems which have operating characteristics and features that make them particularly useful for the rapid transmission of data pulses over telephone lines or undersea cables. These systems may also be used with other links between a transmitter and a receiver.

An important use for a data transmission system like that of the present invention is to permit widely separated computers to communicate with each other and to make it possible to program and supply data to a computer from a distance and similarly to receive computer output at a distance. These systems are also used for transmitting and receiving digitized voice signals.

Telephone lines and cables provide readily available and reasonably cheap links for the transmission of electrical signals. But these lines have developed over the years to be suitable for voice transmissions and their electrical and operating characteristics are extremely poor for the transmission of data. Their range of frequency response is low, in the neighborhood of only several thousand cycles per second. They cause a phase distortion in the transmitted signal. Their amplification characteristics are not uniform between one line and another or on the same line over a period of time. Signals transmitted over telephone lines are frequently multiplexed and otherwise processed during transmission so that the transmitted frequency is not accurately reproduced at the receiving end of the line and the error is not uniform or constant. There are also certain nonlinearities primarily caused by compandors and automatic gain controlled amplifiers which change depending upon the use being made of the line. As will become apparent from the following discussion, there are still other defects in telephone line transmission which present problems to high speed data transmission.

The system of the present invention concerns a transmitter and a receiver, which are sometimes referred to in the art as a modem, which have been especially developed to be interconnected by a telephone line or by other links of circuits which have or can be made to have somewhat similar electrical characteristics. Presently known systems have difficulty in adapting to the differing electrical characteristics of these phone lines. They have been slow, the rate at which data pulses could be accurately transmitted and received being limited as compared with the speeds required for this type of communication. It is one purpose of this invention to provide a system which will make it possible to increase the rate at which data can be transmitted over circuits with poor transmitting characteristics and, in general, to enable telephone and cable circuits with wide ranges of such electrical characteristics to serve as practical links for high speed data pulse communication.

Because no two telephone lines are alike, because any given telephone line changes over time, sometimes quite rapidly, and because it is important to standardize on transmitting and receiving equipment, it is an object of the present invention to provide a system capable of adapting itself to achieve high speed data transmission rates with lines or connecting links having different characteristics. Indeed, while the following discussion will for convenience and simplicity refer to the application of the system or modem to a telephone line, including the various types of telephone transmission connecting circuits and other similar electrical links, it should be understood the invention is not limited to this particular application.

Another difficulty with some known systems for use with telephone lines is that in order for them to operate with the range of characteristics found in ordinary phone lines, they have had to employ a tapped delay line in which the gains from each tap are manually juggled on a trial and error basis by an operator in order to compensate for the distortion in the link. This manual setup and recheck of the gain control for each tap in a multitap delay line requires a great deal of time and when it is remembered that adjusting one tap gain affects the desired settings of all the others, it can be seen that the use of long, e.g., 63 tap, tapped delay line as is desired for accuracy is practically impossible. It is another purpose of this invention to provide a system or modem which automatically adjusts itself to the characteristics of the particular link with which the modem is used.

It is another purpose of this invention to have such automatic adjustment occur frequently to compensate for the variations in phase and other line characteristics during the transmission of data.

It is another purpose of this invention to provide a technique for the adjustment of the compensating characteristics of the receiver while data is being transmitted and without requiring the interruption of data transmittal because the electrical characteristics of the line sometimes change depending on the use being made of the line and on whether or not data is being transmitted. The invention thus makes it possible to have continuous adjustment of the receiver to continuously follow the changes in the line characteristic.

Other purposes and objects of this invention will become apparent from a consideration of the following discussion.

As a brief introduction, the nature and general teaching of the invention can be summarized as follows.

It is well known in the art to provide for the rapid transmission of electrical data pulses over expensive connecting links that have good electrical characteristics. Over such links there is tolerably little distortion, and such transmission has many uses, indeed, it takes place within as well as between the various parts of most data processing equipment.

The problem arises when the machine parts handling the data are widely separated and an attempt is made to use readily available and reasonably cheap lines which cause distortion in the signal that, among other things, forces the use of big, clear and widely separated pulses that can be easily detected at the receiver even though they may have been severely distorted. But the use of such pulses causes a slow data rate.

In general the present invention provides improved ways of detecting the various distortions that may occur, of measuring them, and of then adjusting the received pulses to compensate for this distortion. It should be understood that some of the distortions discussed below may not be present in every situation to such an extent that compensation is required at the receiver.

The overall amplitude or total energy in the signal pulse may be varied by its transmission. In a preferred embodiment of the invention, this distortion is compensated for in two ways. First, a predetermined reference tone amplitude is transmitted with the data signal and then measured at the receiver. The data pulses which are received are then adjusted in amplitude in the same proportion that the received tone signal must be adjusted to correspond to its value at the transmitter. This provides an initial compensation, but it is only approximate since the single reference tone frequency may have been attenuated more or less than the average attenuation of the many different frequencies that may combine to give the data pulse amplitude at the instant when it is measured. After the initial approximate amplitude adjustment is made by means of the reference tone, a reference pulse signal itself is used to provide a continuous correction to an amplitude adjusting subsystem. According to the invention, the amount of these adjustments is proportional to the amplitude distortion which is sensed in the reference pulse signal.

The amplitude of a given pulse as a function of time may be different at the receiver than it was at the transmitter. Indeed, since in typical applications a narrow pulse is transmitted and since a telephone line has a very limited range of frequency response, the received amplitude as a function of time will be materially changed. The change is frequently so great that at the receiver the main pulse amplitude is not only rounded but both preceded and followed by a series of smaller rounded pulses that, considered altogether, look like and are called tails, one leading and one following the main pulse, which is hereinafter called the peak pulse. These distortions would, if uncorrected, make it impossible to transmit the data pulses in rapid sequence or close to one another for the amplitude of the leading and lagging tails would interfere with the signal amplitude on adjacent peak pulses and cause intersymbol interference. In general, this distortion is compensated for by using a receiver that samples each peak pulse only at one instant of time, by adjusting what will be called an equalizer in a particular manner so that the tails of all the other pulses that were transmitted adjacent to the one being measured are at zero amplitude at that instant (and it need be only at that instant).

The overall system of the present invention operates as follows:

A transmitter is connected to a receiver through a link which can be an ordinary household telephone line or an undersea cable, the transmitter (and the receiver) for such an application being understood to include a circuit to make the connecting link resemble a low pass filter.

The transmitter is adapted to receive data information from a source and to rapidly send data pulse signals that carry this information into one end of the line. According to a preferred embodiment of the invention, these data pulses are amplitude modulated. The transmitter also sends certain reference tones or signals into the line.

A receiver is connected to the output of the line which, if the data pulses emitted from the transmitter were to be carried by the connecting link without distortion of any kind, would receive them and send them on to operate related equipment according to the information they carry.

This invention concerns the transmission of data pulses over lines which do distort and accordingly the receiver according to this invention includes amplitude adjusting, storing, sampling and other subsystems which operate together and in synchronization with the transmitter to compensate for the distortion at the instants of sampling. These compensating subsystems of the receiver are referred to generally as an equalizer since, in a sense, they neutralize the line distortion by generating correcting signals which have at the instants of sampling an equal but complementary distortion. In another sense, these subsystems are an inverse filter to the low pass filter that includes the distance connection link so that a signal pulse passing through both filters is, at the sampling times, undistorted.

According to the teaching of the present invention, an adjustment to an equalizer setting is made proportional to the error that is sensed as a result of continuing to use the setting arrived at by previous adjustments. Because the characteristics of the line changes or since the equipment may be shifted from one line to another—these past adjustments become present misadjustments. One significant part of the invention is the discovery that if each of the corrections is made proportional to the sensed error from the previous adjustment, instead of being made in small arbitrary fixed amounts, the equalizer will adjust itself quicker and to a wider variety of line characteristics. In general, this is accomplished by using a portion of the system's output to make the adjustment.

According to the teaching of the present invention, the adjustments to the equalizer are made frequently and preferably without interrupting the transmission of the data pulses. This achieves a virtually continuous adjustment and one which is made according to the characteristics the line has in the presence of data. A further part of the invention is the provision of relatively simple and dependable equipment to make the method commercially feasible. In general, this is accomplished by transmitting a reference signal pulse at known amplitude, detecting this pulse at the receiver after it has been equalized by use of the settings obtained by preceding adjustments, sensing the amount of error in its amplitude, and making each correction to the equalizer adjustments in proportion to the amount of error. The invention includes means to permit the reference pulse signals to be sent so close together that their tails will overlap with one another so as to permit very frequent corrections to the equalizer settings, and and it also includes means to permit reference pulse signals to be sent with data pulses.

According to the teaching of the invention, it may be practiced by analog or, preferably, by digital equipment, and it is a part of the invention to provide such equipment. A simple analog system will be briefly referred to by way of introduction, but it should be understood that the complete invention will be set forth in its best mode now contemplated by the inventor, namely, the digital system.

The following description is made with reference to drawings in which.

The description is intended to be read in light of what is already known to those skilled in the art, for example, that material described and referred to in the Handbook of Automation Computation and Control, particularly volume 2 and the publications referred to therein, edited by Grabbe, Ramo & Wooldridge, published by Wiley (1959); R. W. Lucky "Automatic Equalization for Digital Communication," Bell System Technical Journal, April 1965, pp. 547–589; F. K. Becker et al., "Automatic Equalization for Digital Communication," Proceedings IEEE, January 1965, pp. 96–97; M. A. Rappeport, "Automatic Equalization of the Data Transmission Facility Distortion Using Transversal Equalizers," IEEE Trans. Comm. Tech., September 1964, pp. 65–73; K. E. Schreiner, "Automatic Distortion Correction for Efficient Pulse Transmission," IBM Journal, January 1965, pp. 20–30, W. S. Mohn, Jr., and L. L. Steckler, "Automatic Time-Domain Equalization," Ninth National Comm. Symposium, Utica, New York, Oct. 7–9, 1963; pp. 1–9; G. K. McAuliffe, "ADEM—An Adaptively Data Equalized High Speed Modem," International Conference on Military Electronics, 1964, MIL–E–Con 8, pp. 332–337. As a convenience to the reader, the following description includes some more specific references where it is thought they might be helpful, but they are limited in the interests of brevity.

Figure 1:
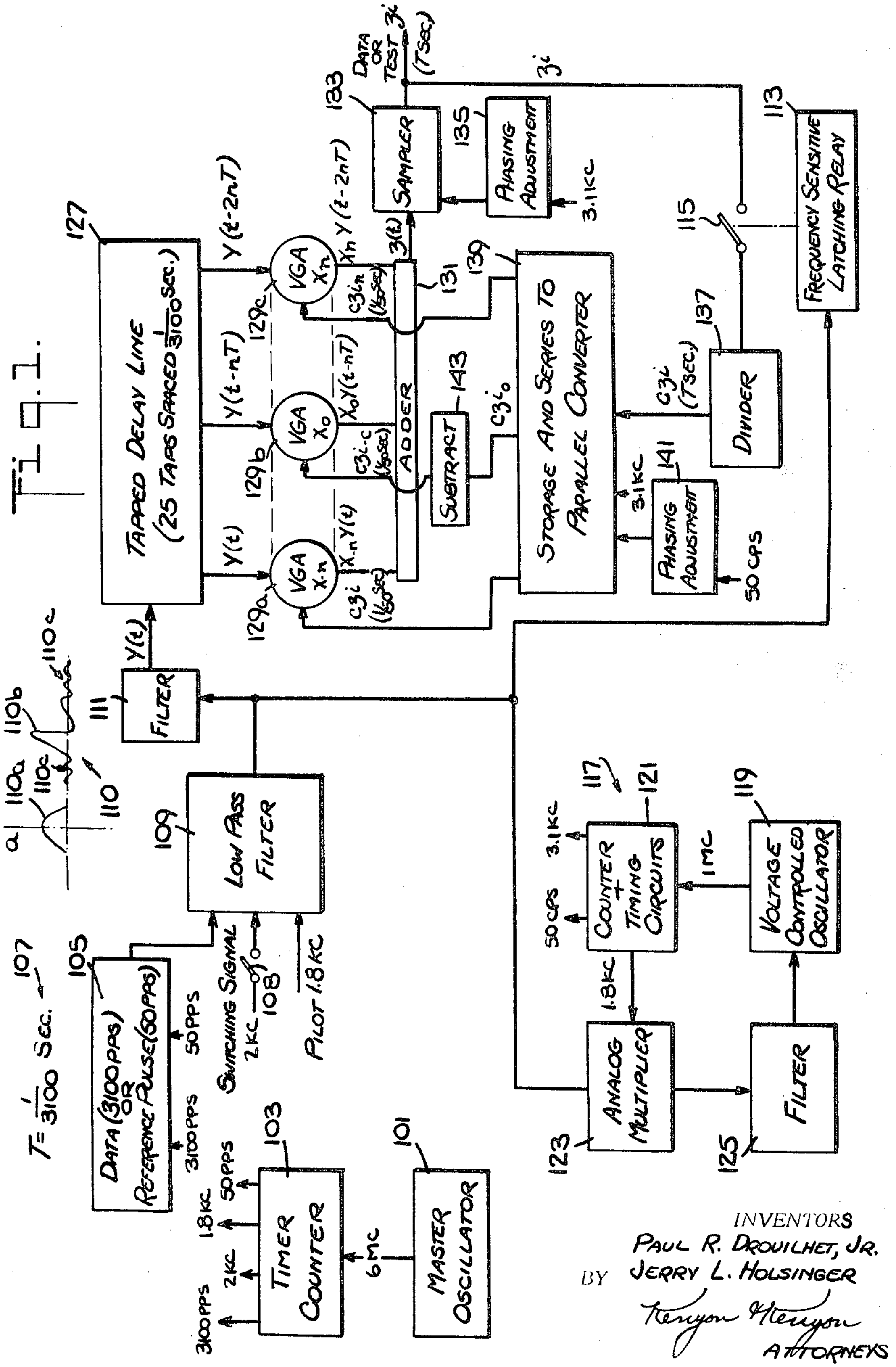
FIG. 1 is a block diagram of an automatic system for adjusting the gains of the tapped outputs of a tapped analog delay line equalizer by amounts that vary in proportion to the error produced by the previous settings of the gains.

The equipment for a simple analog embodiment of the invention is described with reference to FIG. 1.

A master oscillator 101 establishes a basic frequency, for example, 6 megacycles per second, from which the various frequencies necessary for the operation of the system may be derived.

The timing counters 103 are a standard type. The unit using the output of the oscillator 101 as a reference, derives, by known counter techniques, the various frequencies desired for the system, generally these are less than the frequency of the master oscillator. The counter of this illustration puts out a synchronization pulse to the data source at a rate of 3100 pulses per second, p.p.s. According to a convention, the output pulse from the timer counter is not drawn to the data pulse source, rather it is simply shown as an output from the counter and then separately shown as an input to the source. The timer counter 103 also puts out a 2 kc. switching signal, a 1.8 kc. pilot tone, and a 50 p.p.s. sychronization signal to control the repetition of the test pulse source.

A data source and a test pulse source are shown at 105. The data is in the form of amplitude modulated pulses, or is converted to this form, and there are many such data forms which it is desirable to transmit over distance. Although these pulses have a repetition rate of one every $1/3100$ of a second, they need not have this duration. It is frequently desirable that they be somewhat longer, this gives them a narrower band width. The test pulse source is simply a simulation of a standard data pulse. In this simple system no means are provided for distinguishing between the interfering tails of the test pulses and for this reason they cannot be transmitted adjacent to one another but rather must be separated as by a rate of about 50 pulses per second. Even at this rate, there will be some interference with the test pulse amplitude by means of the preceding and possibly even the following test pulse, but these are insignificant in a system which presupposes a tapped delay line of only 25 taps.

The data pulse rate of 3100 p.p.s. gives rise to an interval between pulses of $1/3100$ second. This period is referred to herein as T, see FIG. 1 and 107.

A low pass filter 109 generically indicates the kind of connecting link through which the data desired to be transmitted by means of this system must pass. The low pass filter 109 distorts a transmitter pulse **110*a* so that the ouput may be, for example, a peak pulse 110*b* accompanied by a series of smaller pulses, sometimes called tails, shown generally at 110*c***. Either each pulse must be separated by a period of time much greater than the duration of the pulse itself so as to allow these tails to pass or the distortion that would be caused by the interference of the tails with the adjacent pulses must be equalized. This filter includes the ordinary telephone or cable line. It is understood that conventional amplitude modulation techniques may have to be used at the transmitting and receiving end of the telephone circuit, which may in fact be a band pass link, to make it take on the characteristics of a low pass filter.

A filter 111 is provided at the input of the receiver. This is a low pass filter, with a lower upper frequency limit than the connecting link or low pass filter 109. Its function is to filter out the switching and pilot signals, those being frequencies of 1.8 kc or above, and to pass only the data pulse frequencies below about 1.7 kc.

The switching signal is used to operate a frequency sensitive latching relay 113 before the test pulses are to be sent so as to close switch 115, and it is used again at the end of the test pulse sequence to open the switch 115.

A pilot tone is used to provide synchronization between the transmitter and the receiver. The pilot tone is supplied to a phase locked loop shown generally at 117. The loop includes a voltage controlled oscillator 119 which operates about a center frequency of, for example, one megacycle. This output is fed to timer and counting circuits 121 which provide outputs of 50 c.p.s. and 3.1 kc. for the synchronization of the various components of the receiver. The counter also puts out 1.8 kc. which is used to phase lock the voltage controlled oscillator with the phase of the transmitted pilot tone. The 1.8 kc. is fed to the analog multiplier 123 with the pilot tone, the product is fed to the filter 125 to filter out the double frequency component and the D.C. signal is supplied to the oscillator. For a general discussion of phase locked loops, reference is made to Golomb, Baumert, Easterling, Stiffler and Viterbi, Digital Communications with Space Applications, Prentice-Hall, Englewood Cliffs, New Jersey, 1964, p. 89; Jaffe and Rechtin, "Design and Performance of Phase Locked Circuits Capable of Near Optimum Performance Over a Wide Range of Input Signals and Noise Levels," I. R. E. Transactions on Information Theory, IT–1, 1 (March 1955), 66–76. The equalizer for the FIG. 1 receiver includes a tapped delay line 127 which is constructed so that the data pulse as received, $Y(t)$ is repeated as a delayed replica at each of the taps in sequence every T seconds. In the example, the analog tapped delay line is shown with 25 taps, with a reference tap in the middle, but the number of taps for this application need not be odd and the reference tap need not be centered in the delay line. Tapped delay lines like this are described in Landee, Davis, Albrecht, Electronic Designers Handbook, McGraw-Hill, Inc., 1957, pp. 20–59 to 20–61.

The output of each tap of the tapped delay line 127 is supplied to a variable gain amplifier, these being shown at **129*a*, 129*b* and 129*c***. The function of these amplifiers is to vary the amplitude of the tap output with which they are connected; they should have a gain that ranges from negative to positive.

In practice and for economy, the ordinary variable gain amplifiers, VGA's, can be replaced by analog-to-digital converters, digital potentiometers, and inverting amplifiers which can be used to serve the same function. For a discussion of such potentiometers, see Grabbe, Ramo and Wooldridge, volume 2, supra, at p. 20–50 to 20–60.

The tap outputs, after each has been adjusted by its variable gain amplifier 129, are summed in an adder 131.

The output of the adder is supplied to a sampler 133 which contains sample and hold circuits to sample and read out the output from the adder once every T seconds. For a discussion of such circuits see Grabbe, Ramo and Wooldridge, supra, p. 30–04, Truxal, Control System Synthesis, McGraw-Hill, Inc. 1955, pp. 506–508.

The synchronization of the sampler is controlled by a 3.1 kc. timing signal from the counter timer circuits 121, which is manaully phase adjusted at 135. This adjustment may be satisfactorily made for use with low pass filters 109 which have reasonably small phase distortion by simply watching the input to the sampler on an oscilloscope and manually adjusting the phase of the timing signal fed to the sampler so that sampling occurs at the peak of the received test pulses. A preferable synchronization adjustment for the sampler is described in the full and preferred embodiment of the invention, infra.

During the time while the switch 115 is closed, and test pulses are being supplied by the transmitter, the output from the sampler 133 is fed to a divider network 137 which reduces the sampler output values by a factor in the order of .01 to .1. The outputs from the divider are supplied to a storage and series to parallel converter 139 which receives them as they come from the divider, a receipt which is synchronized by a 3.1 kc. timing signal. This unit scores the samples and then, under the control of a 50 c.p.s. synchronization timing signal, supplies them to vary the gains of the variable gain amplifiers, or their equivalents, 129*a*, 129*b* and 129*c*. The series to parallel converter 139 applies the pulses to these VGA's in the order in which they are received. To understand its phasing, it is important to remember that for the automatic adjustment to the equalizer, which is to say to the gains of the variable gain amplifiers, the transmission of data is interrupted, the switching signal switch 108 is closed and the latching relay controlled switch 115 thereupon closed, and a test pulse transmitted. When the pulse is received it is in the form of a peak pulse preceded by and followed by a tail. It is important that when the peak pulse appears at the first tapped delay line output the resulting summed sample pulse $Z_i$, reduced by the divider 137, be supplied to the storage and series to parallel converter 139 at the start of its cycle, and that the following summed samples $Z_i$'s be applied in sequence. After all samples are received, the storage and series to parallel converter applies the first received pulse in its cycle to the variable gain amplifier associated with the first tapped delay line output. The phasing adjustment 141 is used to control the 50 cycle per second timing signal which triggers this application so that the first pulse received in the cycle of the unit 139 is the output which includes the peak test output from the first tap.

In this manner a single test pulse gives rise to 25 sample outputs as its peak pulse upon receipt appears at the 25 taps of the tapped delay line. This set of 25 samples is proportionally reduced by the divider 137, supplied in sequence to the storage and series to parallel converter 139, and applied in order to the gains of the VGA's 129 associated with the taps. The signal to the variable gain amplifier 129*b* associated with the reference tap is reduced in a subtractor before being supplied to adjust the gain. The subtract unit simply biases the pulse with a negative pulse of a reference amplitude.

It will be seen that the system adjusts the gains of the VGA's so that for each of the isolated test pulses the sampler's output always approaches zero except that, for the time when the peak of the test pulse appears at reference tap $X_0$, the sampler's output approaches a positive value equal to the predetermined negative bias of the subtract unit 143. The system, in addition to equalizing, thus constitutes a means for accurately maintaining a uniform data output amplitude which is important to accurately decode an amplitude modulated pulse.

This equipment operates to adjust the initial tap gain settings, $X_i^0$, as follows. A single test pulse is transmitted and the resulting output samples $Z_i^0$ are measured by sampling the tapped delay line output signal every T seconds. The reference sample, $Z_0^0$ is then taken to be the largest of the samples so obtained. The remaining Z's are numbered according to the convention $Z_1^0$ is the first sample after $Z_0^0$, $Z_{-1}^0$ is the first sample immediately preceding $Z_0^0$, etc. Once these samples are obtained, one corresponding to each tap gain at which the test pulse peak appeared, the next set of tap gains is calculated according to the equation $X_i^1=X_i^0-c\,[Z_i^0-d_i]$, where the $Z_i^0$'s are the samples just measured and $d_i$ is zero except for $i$ equal to zero when $d_i$ is equal to 1. I.e., $$d_i=1,\ i=0 \qquad 0,\ i\neq 0$$

and $c$ is a gain constant whose value is of the order of .01 to .1. A second test pulse is sent with the tapped delay line equalizer adjusted to the new tap gains just calculated and the resulting $Z_i^1$'s are measured. A third set of tap gains is then calculated according to the equation: $X_i^2=X_i^1-c\,[Z_i^1-d_i]$. Using this third set of tap gains, a third test pulse is sent, etc. This procedure is repeated periodically according to the general rule $$X_i^{v+1}=X_i^v-c\,[Z_i^v-d_i]$$

It has been found that if this procedure is repeated a number of times, for example, 25–100 times on some lines and depending on how incorrect the original tap gain settings were, the tap gains will converge toward values that provide good compensation under a wide variety of line characteristics.

In general, this system may be applied to any connecting link without unusually large phase distortion. For example, the system may be used with a Schedule 4*b* line, as those lines are categorized by FCC tariffs and the standard trade and industry practice, to transmit data pulses at a rate of 3200 per second. The system may be used with any normal telephone circuit to transmit data pulses at the rate of up to approximately 2000 pulses per second. As one increases the data rate over 2000 pulses per second, certain lines may be found with electrical phase characteristics too poor to be used by this system but many of the better ordinary telephone lines may be used with pulse frequencies of up to about 3200 or even more pulses per second. According to this teaching and the equipment that has been described above, the equalizer once set up, and during the transmission of the reference pulses, will automatically adjust the gains to give undistorted signal pulse outputs on lines having a wide range of electrical characteristics, the statement that the distortion is eliminated being taken to refer to its elimination only at those instants where the pulse is being sampled. It need not and usually will not be eliminated at the intervening points.

After the test pulses have been sent, the switching signal is used to open switch 115 and data transmission is resumed.

Figure 2:
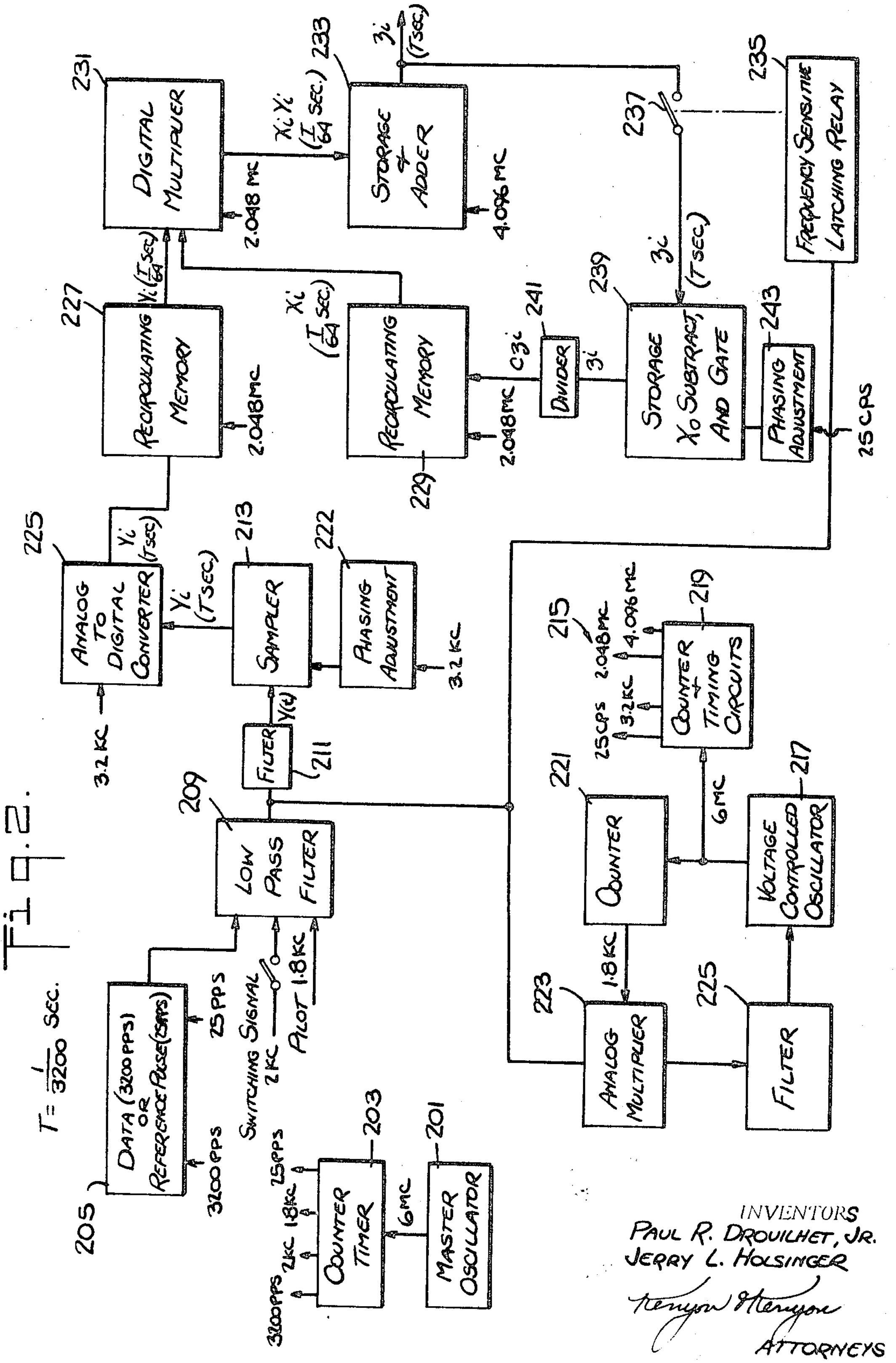
FIG. 2 is a block diagram of an automatic system for adjusting the gains of tapped digital delay line equalizer by amounts that vary in proportion to the error produced by the previous settings of the gains.

The digital portion of the invention for practicing the method is illustrated in FIG. 2. In this digital system, the tapped delay line, which is known in the art as a technique to compensate for the pulse distortion caused by a phone line, is replaced by a digital technique and digital equipment which provide another way to compensate for the pulse distortion and which makes it possible to conveniently, rapidly and automatically adjust this digital compensation so as to provide a highly accurate output whose accuracy is maintained even though the phone lines may vary its distortion of the pulse over a period of time. This digital system is flexible enough to adapt to different phone lines and different phone connections. It also makes feasible the use of a larger number of taps for greater accuracy in compensation.

The FIG. 2 embodiment is described below, first by a description of the individual elements and then by a description of how they are to be combined and used.

At the transmitter, a master oscillator 201, similar to oscillator 101 described above, drives a counter.

In this particular embodiment, the timing counter 203 has four output signals: a synchronization signal for the data and test pulse source 205; a 2 kc. switching signal; a 1.8 kc. pilot tone; and a 25 p.p.s. synchronization signal for the test pulse repetition. The switching signal and pilot tones are chosen to be any convenient frequency above the data so they can be filtered out without interfering with the data. The 25 p.p.s. pulse rate for the test or reference pulse is chosen so that the test pulses are as frequent as possible without interfering with one another.

The low pass filter, or the connecting link 209, may be the same as for the analog system except, by virtue of the large number of taps made possible by the digital system of the invention, the filter may have more widely varying and poorer electrical characteristics than are suitable for the analog equipment. In practice, this makes it feasible to use almost any normal telephone or cable circuit as the link.

A low pass filter 211 with a cutoff at about 1.7 kc., similar to the filter 111 described above, is used to pass the data and block the pilot and switching signals from the sampler and following circuits.

The sampler 213 contains sample and hold circuits to sample the output of filter 211 once every T seconds, T being equal in this embodiment to 1/3200 second, and it puts out this sample once every T seconds. T is chosen as short as possible consistent with the accurate recognition of the data pulse amplitude of the receiver output.

This sampler is synchronized by a 3.2 kc. signal derived from a phase locked voltage controlled oscillator and timing circuit referred to generally as 215. This circuit is like the circuit 117 described above and contains a voltage controlled oscillator 217 that has a center frequency that may be about 6 megacycles which is supplied to counter and timing circuits 219 and 221 which provide the desired frequencies for synchronization of the various components of the receiver and for supply to an analog multiplier 223 which multiplies the 1.8 kc. output by the pilot tone, the output being supplied to a filter 225 to filter out the double frequency and supply the D.C. to control the oscillator in accordance with the phase of the transmitter's pilot tone. The sampler may be adjusted as described above by phasing adjustment at 222 so that it operates once every T seconds at the time of the maximum amplitude of the peak pulses. This is not the most desirable sampling time, as will be explained below.

The output of the sampler is fed to an analog-to-digital converter 225. Such converters are discussed by Grabbe, Ramo and Woolridge, supra, at p. 30–04.

It has been found convenient to represent the analog amplitude in ten bit digital form. This ten bit number can represent 1,024 amplitude levels. This has been found a fine enough resolution to be used in practice with pulses modulated to eight discrete levels of amplitude. For convenience of description, these ten bit sequences that represent the samples, $Y_i$, are referred to as a unit, with a period of T seconds.

It might be pointed out that if an eight level pulse is initially employed, only three bits are necessary to uniquely designate the pulse level. However, at the point of the output of the sampler 213, the pulse levels may have been considerably distorted; instead of receiving only eight discrete levels, a range of levels is apt to be presented. It is desirable to measure these distorted levels quite accurately so that when the appropriate corrections are made, the resulting data pulse levels will be quite accurate in proportion to the transmitted data pulse levels.

The filtering operation previously performed by the analog tapped delay line and the VGA's as shown in the FIG. 1 embodiment is preperformed in this FIG. 2 embodiment by a digital convolution as described below, between the most recent 63 samples of the input ($Y_i$) and 63 gain factors ($X_i$).

This digital convolution is described by the operation:

$$Z_k = \sum_{i=-n}^{n} X_i Y_{k-n-i}$$

where $n=31$ corresponds to the 63 $(2n+1)$ tap situation and Z is the gain adjusted pulse output at instant $k$. This operation is performed as follows:

The recirculating delay line memory 227 receives the digitized output of the sampler 213, $Y_i$, once every T seconds. It holds and circulates a sequence of these samples, putting out a replica of each one every T seconds. The number of times each particular one of the samples is put out is taken to be equal to the number of taps which the equivalent analog delay line would have. The length of this holding and circulation, which corresponds to the length of what will be called the digital tapped delay line, may be arbitrary in this digital embodiment of the invention. In the particular design being disclosed, it is 63 taps or 63 T seconds long, sufficient length to achieve good pulse compensation in telephone and cable applications. Accordingly, there will be 63 sample outputs, $Y_i$, in the recirculating memory during any T seconds and each of these will be produced once. The periodicity of this output can conveniently (but need not) be made 1/64 T seconds. Since there are only 63 outputs of the data signal pulse samples, there will be one period of 1/64 T seconds of no output in every T seconds.

Once every T seconds, this delay line memory 227 drops the oldest sample $Y_i$ and adds a new sample. Recirculating delay line memories are discussed in Grabbe, Ramo and Wooldridge, supra, at p. 19–30.

Another recirculating delay line memory 229 serves to store a gain factor for use with each of the outputs of the sample memory 227. These gain factors correspond to the gains of the VGA's 129 of the analog equalizer of FIG. 1. The calculation and supply of these gains to the memory 229 is described below, but it should be understood that after the gains have been initially calculated, they will be adjusted only as variations may occur in the phase and other characteristics of the phone line being used and in response to the distortion this causes in the equalizer output. Thus, unlike the memory 227, the memory 229 does not lose one of its 63 numbers each T seconds and gain a corresponding new one but rather retains all 63 numbers (representing gains or gain factors) until the line characteristics change whereupon one or more of them may be adjusted. The general construction of the recirculating delay line memory 229 is, however, like that of the memory 227.

The outputs of both recirculating memories are supplied to a digital multiplier 231, the full output being supplied once every T seconds with one output from the sample memory 227 and the corresponding output from the gain memory 229 being put out in synchronization once every 1/64 T seconds, there being one potential output that is not used every 1/64 T seconds.

The digital multiplier 231 operates to multiply a sample $Y_i$ from the sample memory 227 by a corresponding gain factor $X_i$ from the gain memory 229 at the rate of one every 1/64 T seconds. Once every T seconds, 63 multiplications are made. Each multiplication involves 10 bits from the memory 227 and 10 bits from the memory 229 to provide a 20 bit $X_iY_i$ output from the multiplier. During T seconds, each $Y_i$ will be multiplied once by one of the gains to give in sum an output that corresponds to the output from the sampler 133 in the analog system of FIG. 1. Each T seconds the output of a given sample in the sample memory 227 is delayed for an additional 1/64 T seconds with respect to the gain memory 229 so that it is multiplied by the next gain factor, and so forth until each sample $Y_i$ has been multiplied by each gain factor $X_i$ every 63 T seconds.

A digital multiplier is discussed by Grabbe, Ramo and Wooldridge, supra, at p. 18–19.

A storage and adder 233 receives an output $X_i Y_i$ from the digital multiplier 231 every $\frac{1}{64}$ T seconds except one for a total of 63 outputs in T seconds and stores and adds these 63 outputs together once every T seconds. It will be seen that the output $Z_i$ from this storage and adder every T seconds corresponds to the outputs from the sampler 133 in the analog system of FIG. 1 and that, while the system is in adjustment the output pulses $Z_i$ correspond very closely to the amplitude of the pulses which have been transmitted.

When the system is being used to automatically adjust the settings on the digital equalizer, that is to say the gain factors $X_i$ in the gain memory 229, a switching signal is transmitted which operates the frequency sensitive latching relay 235 and its associated switch 237. Following this, the reference pulses are transmitted sufficiently separated so that there is negligible interference between the tails of adjacent pulses and accordingly, when the tap gains are correctly set, the outputs from the storage and adder should be zero except for the output of the peak of the received pulses from a reference pulse multiplied by the reference gain factor $X_0$ which output should be equal to the reference amplitude. This series of outputs is fed to a storage, $X_0$ subtract and gate, 239 which receives the samples in sequence and, upon being triggered by a phase adjusted synchronization signal of 25 c.p.s., supplies them to a divider 241 and then to the recirculating memory 229 within a period of T seconds. It is important that the reduced or divided output from the sample corresponding to the time when the peak received reference pulse is multiplied by the first gain of the memory 229 be added to adjust the first gain in the memory so that it is adjusted in proportion to the correction needed to render the summed output at that time zero. This may be accomplished by operation of the storage, $X_0$ subtract and gate 239. This gate 239 is constructed so that within each cycle of its operation, the first of a series of pulses that is received is applied to the first gain factor, the second received pulse being applied to the second gain factor, etc. The cycle of the gate is timed by a 25 c.p.s. timing signal supplied through a phasing adjustment 243 so that its cycle commences at the same time it receives the sample output $Z_i$ that contains the product of the peak received pulse multiplied by the first gain factor of the recirculating memory 229. By the gate's construction, this first received sample will be applied to adjust the value of the first gain factor. The other sample outputs are applied in sequence in the same manner so that the next proportionally reduced sample output $Z_i$ is applied to adjust the next gain factor, etc., except that the output from the storage and adder 233 corresponding to the time when the peak test pulse was being multiplied by the reference gain, $X_0$, is reduced in the storage unit 239 by a standard reference value so that the corresponding gain of the memory is adjusted to cause an output from the storage adder 233 equal to the reference value to be subtracted. That is to say, the reference gain factor $X_0$ should be adapted so that the summed product from this time should have zero variance from the predetermined reference value.

It should be remembered that the adjustment of any one gain factor may change the desired adjustment of all the others. So a number of test or reference pulses must be sent and, as the gains converge to the ideal value, the measured errors in the outputs, $Z_i$'s, become smaller and the proportional corrections thus also become smaller.

After a sufficient number of test pulses have been transmitted to permit the digital equalizer to adjust the gains of the recirculating memory 229 very close to the ideal, i.e., until the proportional corrections being made are very small, the test pulsing is discontinued, the switching signal is sent to open the switch 237 through the latching relay 235 and the transmission of data is resumed using the newly adjusted gain factor $X_i$ settings to provide the compensation for their distortion.

Figure 3:
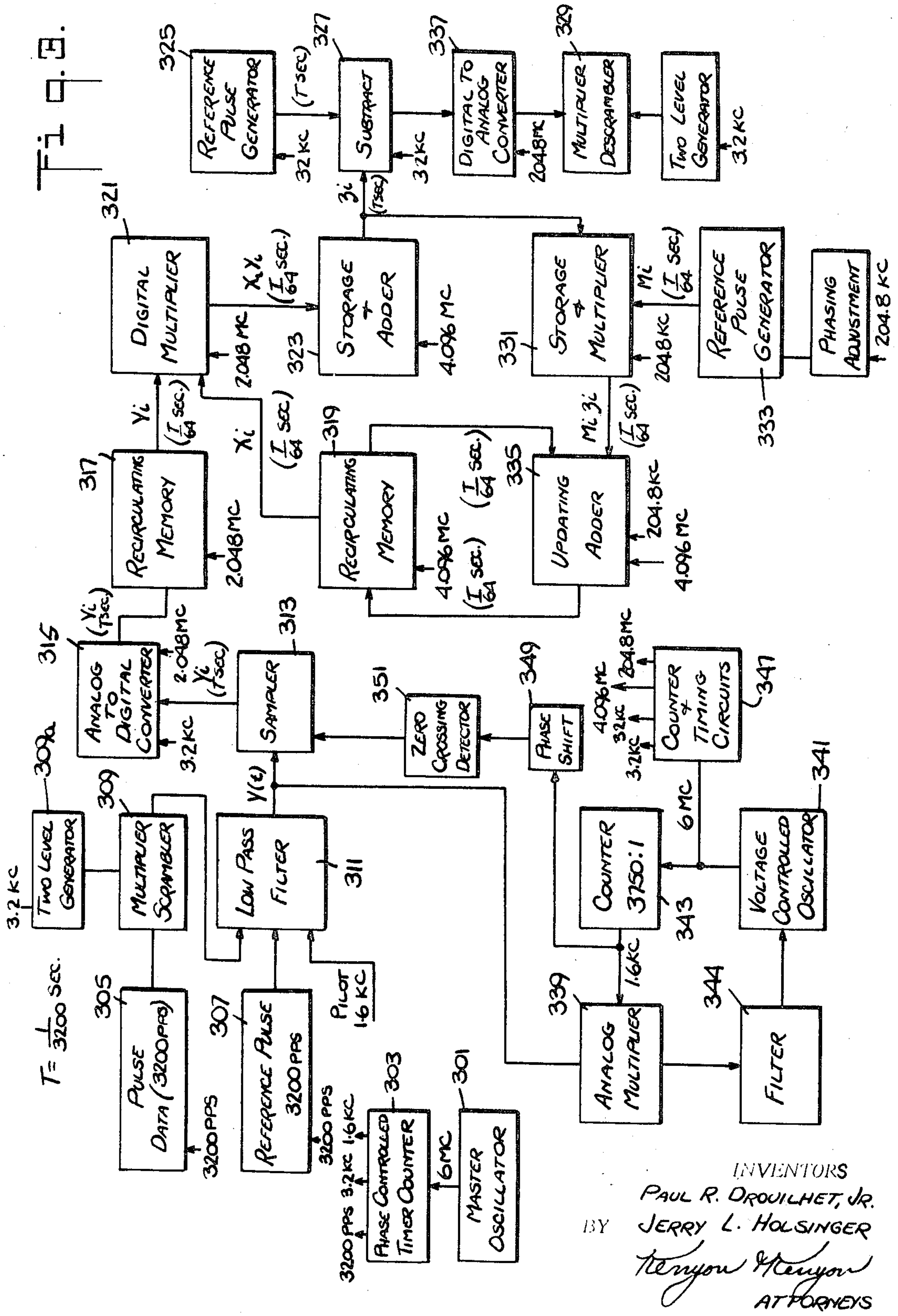
FIG. 3 is a block diagram of an automatic system for rapidly adjusting the gains of a tapped digital delay equalizer without interrupting the transmission of data pulses.

With reference to FIG. 3, a preferred embodiment of the invention is a digital system by which the pulse distortion caused by the low pass filter is sampled and compensated for frequently and without interrupting the transmission of data.

In this system, a master oscillator 301 is used to supply a basic reference frequency, for example, 6 megacycles, which drives a timer counter 303 which produces the required synchronization and pilot frequencies at the proper phase relation to each other as will be apparent from the following discussion.

The data pulse signals are supplied from the source 305 at a convenient rate which, in this embodiment may be about 3200 pulses per second. These amplitude levels of the data pulses should for the first described variation of this embodiment be distributed with reasonable randomness and if they are not, they should be scrambled as described below. In this first described variation, the random data desirably have a small average value, not zero, for reasons that will become apparent.

The sequence of reference pulse signals are supplied from source 307, also at a rate of 3200 pulses per second, the same rate at which the data pulse signals are supplied. This sequence of reference pulse signals must have certain characteristics so that each pulse in the sequence, after it has been received, sampled at T second intervals, multiplied by various gain factors and summed with other received reference pulses into a sample output, $Z_i$, may be separately measured and used to adjust the gain factors. The technique and particular types of references which will be described will be seen to, in effect, put a unique identification tag on each particularly placed pulse in the reference pulse sequence which permits them to be sorted out from each other at the received even though they are sent rapidly so that their tails are intermingled at the receiver. Although the reference pulses may, by this technique, be sent at the same rate that the data pulses are sent, they may also be sent half as fast, a third as fast, etc. so long as they are sent synchronously with the data pulse.

In this first described variation of this embodiment, the data pulses are separated from the reference pulses in the following manner. The data pulses average to the known small average value. The reference pulse sequence will be found in this technique to be multiplied by the $Z_i$ outputs and it will also be found that this gives a small average or left over value for every complete sequence. It is a part of the teaching of this invention to make the small known data average exactly offset the small known average caused by the two-level sequence which has one more pulse of one sign than pulses of the other sign. The sending of the reference pulses in rapid sequence is important so that the averaging of the data may take place as quickly as possible.

The data effects are allowed to average out of the reference pulse measurements and the reference pulse measurements are then used to measure the pulse distortion and to adjust the gains in the recirculating gain memory much as the reference pulses were used to make this adjustment in the embodiment of FIG. 2.

The reference pulse signal sequence may be in the form of a two-level sequence and, in particular, it may be the pseudo-noise given in Appendix II, Table 2, p. 169, of Golomb, Baumert, Easterling, Stiffler, and Viterbi, "Digital Communications With Space Applications," Prentice-Hall, Englewood Cliffs, New Jersey, 1964, Chapters 1 and 8 and Appendix II. This sequence may be generated as described in these pages and in view of what is already known to the art. While for this embodiment the sequence that is 63 pulses long is preferably used, it is believed that any two-leved sequence as defined at pp. 51–52 of this work may be used.

In order to ensure that the data pulse signals average to the proper value over a small number of pulses, it should be given a random appearance by a scrambler 309. This scrambler may be constructed as a multiplier since it is operating on pulse amplitudes.

This scrambler is preferably driven by a second two-level sequence generator 309*a* whose period is not only different from the period of the reference two-level sequence but also incommensurate with it. The generator supplies the pulses 3200 p.p.s.

In summary, each data encoded pulse from the source 305 is scrambled at 309, modified in amplitude by a pulse from the reference amplitude generator 307, and passed through the low pass filter 311 together with the 1.6 kc. pilot signal from the pilot signal generator 303.

The distorted continuous output of the low pass filter $Y(t)$ is sampled by a sampler 313.

The sampler operates once every T seconds, and in accord with the teaching of this invention, it operates when the pilot tone at the receiver is passing through the zero point. Accordingly, the output $Y_i$ which is supplied from the sampler every T seconds includes only the data and reference pulse amplitude (which is at this point in the circuit, of course, distorted).

An analog-to-digital converter 315 encodes the pulse amplitude as a digital signal so that further processing may be by digital techniques.

A recirculating sample memory unit 317 retains 63 sample pulse values at a time, as in the embodiment of FIG. 2, and as a new pulse value comes into the memory unit 317, the oldest pulse value is dropped from the unit. It should be understood that with the use of a two level reference pulse sequence, it is desirable to store no more than the same number of pulse samples (or to use the same number of tap gains) as there are pulses in the two level reference pulse sequence. For convenience of initial synchronization, in the preferred embodiment, the same number of pulse samples are stored at the receiver as there are pulses in the two level sequence.

A second recirculating gain factor memory unit 319, similar to the memory 229, also retains 63 values as in the FIG. 2 embodiment.

A digital multiplier 321, like multiplier 231, operates so that once each T seconds each of the 63 sampled pulse values $Y_i$ in the memory unit 317 is multiplied by a separate one of the gain values $X_i$ in the memory unit 319. The time period for each such multiplication is $\frac{1}{64}$ of T seconds. Since only 63 values are multiplied each T seconds, this means that the output of the multiplier 321 will be a blank for one of the $\frac{1}{64}$ T second periods each T seconds.

A storage and adder unit 323 stores the 63 $X_iY_i$ generated each T seconds and adds them together to provide a modified sampled pulse value output $Z_i$ each T seconds. If the gain values $X_i$ in the memory unit 319 are properly set, then the amplitude value of a pulse $Z_i$ at the adder 323 output will correspond to the amplitude of a corresponding pulse when it was fed into the low pass filter 311.

Since the pulse $Z_i$ was modified in amplitude by one of the reference amplitude pulses supplied by the reference pulse generator 307, that modification must be undone in order to provide an accurate data encoded pulse. The reference pulse generator 325 and subtract circuit 327 perform this function. Subtract circuits of this sort are discussed by Grabbe, Ramo and Wooldridge, supra, at p. 18–11.

The output must then be descrambled in the same manner in which it was scrambled, this can be done by descrambler 329, which is synchronized according to techniques known in the art.

When the connection between the receiver and transmitter is first made, the gain values in the memory unit 319 will normally be very much different than is desired. Furthermore, during the course of transmission, the characteristics of the low pass filter 311 may vary, as is typically the case where the telephone lines form all or a part of the low pass filter 311. In order to arrive at correct gain values and to keep such gain values continuously revised, the following takes place. Each output from the storage and adder 323, $Z_i$, is supplied to a storage and multiplier 331. This unit holds $Z_i$ for T seconds. During this time it receives from a reference pulse generator 333 pulses from the two-level sequence and in this preferred embodiment the complete two-level sequence of the reference pulses; in other words, this reference pulse generator should operate to produce the 63 pulses of the pseudo random sequence within the time the reference pulse generator at the source 307 produces one pulse and, for convenience, it is constructed to supply a pulse every $\frac{1}{64}$ T seconds. The multiplier 331 multiplies each of these reference pulses against the $Z_i$ being held in storage and supplies the output $M_iZ_i$ every $\frac{1}{64}$ T seconds to an updating adder. This adder may be constructed as described in Grabbe, Ramo, and Wooldridge, supra, at p. 18–11. The adder operates to supply the appropriate $M_iZ_i$ to the gain in the recirculating gain memory 319.

As an introduction to the description of how this system is synchronized, so that the appropriate $M_iZ_i$ is added to the appropriate gain in the recirculating memory and to understand how it is that the reference pulses are separated from the data and how their tails are kept straight from one another, several points must be understood.

First, in this first described variation of the embodiment of FIG. 3, the data pulses have been scrambled and in addition they are being multiplied against reference pulses from generator 333 which are a two-level sequence. The consequence of this is that over any significant number of samples, the effect of the data pulses is that they average to an average which, since that is known, may be biased out. A way for doing this is described below.

The next point to keep in mind is that, every T seconds, each $Y_i$ is multiplied by an $X_i$ and these are all summed to give $Z_i$.

Expressed mathematically:

$$Z_k = \sum_{i=-n}^{n} X_i Y_{k-n-i}$$

where $Z_k$ is the gain adjusted pulse output at instant $k$T and where there are $2n+1$ stored samples of $Y_i$ and $2n+1$ stored gains $X_i$.

The equipment is so designed so that when a $Y_i$ first enters the recirculating memory 317 it is multiplied by the first $X_i$. If there are taken to be $2n+1$ taps with a reference tap $X_0$ in the middle, the first tap may be denoted $X_{-n}$. It should be understood that the reference tap need not be in the middle, but this is a suitable compromise location to be used with, for example, different telephone circuits.

Each T seconds the recirculating sample memory recirculates and steps the sample ahead by one unit so as to discard the oldest value at one end and so as to replace it by taking in the most recent sample at the other end. The samples of the sample memory are also stepped ahead one unit each T seconds relative to the gain factors in the gain memory 319. That is, each sample is multipled by the gain factors in sequence, and the particular gain factor $X_i$ which is multiplied by a sample $Y_i$ depends on how many T second intervals have elapsed since the sample $Y_i$ was first received.

If the first $Y_i$ to enter the recirculating memory 317 should have as a component thereof the received peak of the reference pulse in, for example, position $f$ in the two-level sequence, it will be understood that in this component there will be gain adjustment by the first gain factor, and that its preceding tail (which will have been present in the preceding sequence of samples $Y_i$) will be adjusted by the sequence of the other $X_i^1$ and that therefore, when the gain adjusted sample outputs are summed, there will be present in the $Z_i$ a sum of the value of the sequence pulse in position $f$ as adjusted by the gain factors.

It will be understood that the sum of this component should ideally be zero and that in the next T seconds when the peak received pulse of the pulse in position $f$ is being multiplied by the next gain factor and the tails multiplied by the corresponding gain factors (to the extent that these tails are included in the samples $Y_i$'s being stored in the sample memory 317) should also be zero, and similarly, for each time except when the received peak of the reference pulse in the $f$ position is multiplied by the reference gain factor at which time the sum of this component in $Z_i$ is equal to the reference pulse value (this value being set by the subtractions made in connection with the adjustment of the reference gain). But it should also be understood that unless the tap gains are in perfect adjustment, the sum of this component in $Z_i$ will not be zero but some small error value. According to this invention, the error value for a particular component (the component corresponding to the component resulting from the transmission of aparticularly positioned pulse in a reference pulse two level sequence) in a particular $Z_i$ is used to adjust the gain which may be identified as the gain which was multiplied with the received peak of that particular reference pulse in the reference pulse sequence.

It should also be understood that the component of the particularly positioned pulse in the reference pulse sequence that is buried in $Z_i$ cannot be separated out and applied to adjust the appropriate gain factor each time the adjustment is made to the gain factor. Consequently, the individual adjustments will be erroneous for they will include data components and parts of the tails from other pulses in the reference pulse sequence. These other components will, by the technique of the present invention, be found to average out. The data components will average to zero because, over a period of $p$, the period of the two level sequence, the data components being included in the adjustments made to any particular gain factor will be multiplied by equal numbers of positive and negative pulses in the reference pulse sequence and the average of the data components in the adjustments will thus be zero. Actually, there is one more pulse of one signal than of the other signal in the reference pulse sequence but this small residual portion of the data left in the adjustments once every $p$ period may be readily compensated for by, if the average data value is known, subtracting out this amount whether or not the average data value slightly offsets all of the reference pulses in the reference pulse sequence to compensate for the effect of the "odd" pulse. The component in the adjustments from the tails of the other pulse in the reference pulse sequence will be found over a period of the complete sequence to average out, just as the data averaged out and with the same exception because of the fact that there is one more pulse of one sign than of the other sign. If the data is of known average value, the effect of the odd pulse on the data component and its effect on the components from the other pulses in the reference pulse sequence may be offset so as to neutralize each other.

The procedure is as follows. The gain adjusted pulse $Z_i$ is multiplied each T seconds by all the pulses in the reference pulse sequence, these being supplied by the fast generator 333. The product of the gain adjusted pulse sum $Z_i$ which contains the peak received amplitude of a particular pulse in the reference pulse gain adjusted by the first gain factor $X_{-n}$ in the gain memory and the corresponding particular pulse in the fast reference pulse sequence is applied to make a small adjustment in the first gain factor $X_{-n}$. In the next period of T seconds it will be apparent that the peak received amplitude of this same particular pulse in the sequence will be amplitude adjusted by the second gain factor $X_{-n+1}$ and summed into a $Z_{i+1}$ and, accordingly, the fast generator 333 is stepped ahead by one pulse in the sequence with respect to the gain factors such that the same particular pulse when multiplied by $Z_{i+1}$ is applied to make small adjustment in the gain factor $X_{-n+1}$. It will also be apparent that this pulse in the reference pulse sequence will be multiplied by each of the other pulses in the reference pulse sequence each T seconds and the product thereof applied to each of the gain factors each T seconds. But it will also be apparent that over a period of 63 T seconds, each gain factor will have been adjusted according to the particular pulse multiplied by each of the pulses in the fast generator reference pulse sequence and that the sum of all of these other adjustments averages to one unit each 63 T seconds. This is because the reference pulse sequence has one more positive (or negative) pulse than negative (or positive) pulse (all of the pulses being of equal absolute amplitude). By adjusting the average of the data pulse values to be equal to this effect of the reference pulse sequence, their effects can be used to average out to zero. In other words, the data pulse average can be used to subtract $1/63$ of the reference pulse amplitude from each tap gain each T seconds.

There is one exception, the correction signal applied to the reference tap $X_0$, is lessened by a reference value. This causes the gain of this tap to compensate for the lessening so that the adjustments are made around the gain value required to produce a pulse to offset the value subtracted. In this way, the amplitude of the output from the storage and adder 323 is controlled.

In a second variation of the embodiment of FIG. 3, the data need not be scrambled, assuming only that it is not periodic with the period P of the two level sequence to any significant extent, and the data need have no predetermined average value. Instead, the pulses in the fast two-level reference pulse sequence at the receiver are all offset in value by small equal amounts so that if any number is multiplied by each of the pulses in the sequence, and these products summed, that sum will be zero. If this condition is met, then it does not matter what average value the data components in the $Z_i$ outputs have since when multiplied by the pulses in the fast two level pulse sequence, the product will be zero, except that the value of the data may not have a period which is similar to the period of the two-level sequence. For example, the data may consist of a series of repeated signals uniform over a long period of time, but it may not consist of another two-level sequence generator of period equal to less than P. It will be found that many data sources meet this requirement without the need for separate randomizing or scrambling.

It will be appreciated that the reason why the pulses of the data pulse sequence must be slightly offset to meet the condition described just above is because in the two-level sequences referred to, there is one more pulse of one sign than there are pulses of the other sign and if any number such as the data components in the $Z_i$'s are multiplied by all of these pulses, there will be one product left over, so to speak. The effect should be $1/k$ of the absolute value of the pulses in the sequence, there being $k$ pulses in the sequence and the offset should be of the opposite sign to the sign of the "odd" pulse in the sequence. It should be understood that another sequence having an equal number of pulses of each sign might be devised which could be produced by available equipment and which would have the other properties of the two level sequence which are utilized by the technique of this invention and, in this situation, the pulses would not have to be offset to meet the above described condition since there would be no product left over.

It will be remembered that in the FIG. 2 embodiment and during the time when the peak received pulse caused by the transmission of a reference pulse was being stored in the sample memory 227 for a period of 63 T seconds, there also being 63 gain factor adjustments to be made, that the peak pulse was first multiplied by the first gain factor and at the same time the values of the preceding tail at T seconds intervals were multiplied by the corresponding gain factors and the products summed into an output $Z_i$, which sum was proportionally reduced and used to adjust the gain factor by which the peak received pulse had been multiplied. It will thus be apparent that in the FIG. 3 embodiment, with the continuous transmission of reference pulses, there will be a sequence of 63 received reference pulses in the sample storage memory 317 and, in any given T seconds, each, together with its associated tail, must be multiplied by the gain factors, summed, and the sum proportionally reduced to adjust the gain factor which had multiplied the peak received pulse amplitude number.

It is apparent from the preceding discussion of the FIG. 3 embodiment how the samples $Y_i$'s contain components of the particular pulses in the two level sequence, and how each of these components is adjusted by the gains $X_i$ and summed to a component in the $Z_i$. It is also apparent from the preceding discussion how the multiplication of the $Z_i$'s by the two level sequence must be synchronized so as to cause the proper reference pulse component in the $Z_i$ to be separated out and used to adjust the appropriate gain factor.

It is a feature of this invention to provide not only for maintaining this synchronization once it is set up but to provide for the initial synchronization being made automatically.

Figure 4:
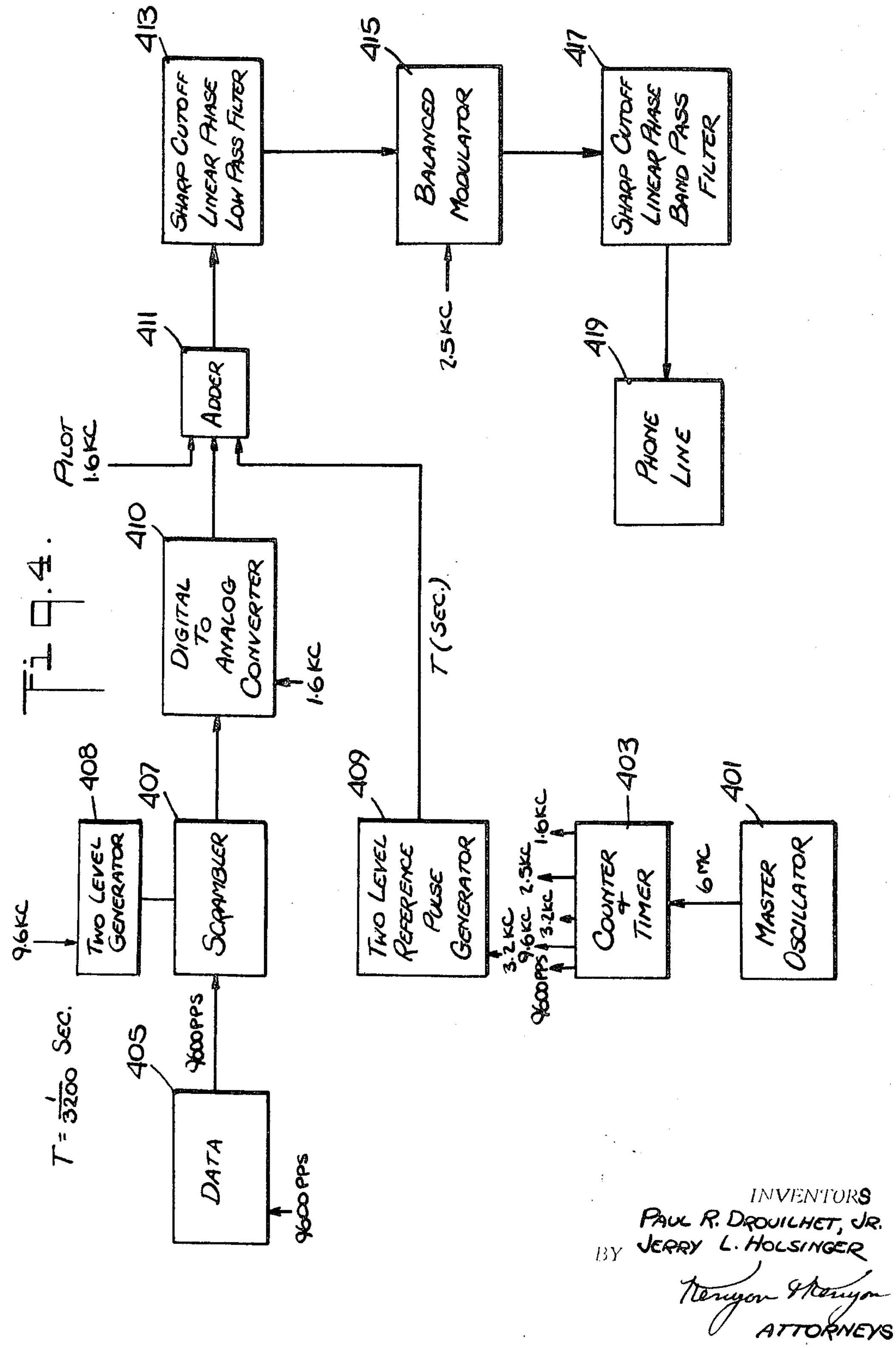
FIGS. 4 and 5 are block diagrams of the transmitter section and the receiver section, respectively, of a system for transmitting data over the telephone lines, which system employs a tapped digital delay line equalizer in which the tapped gains are continuously and automatically adjusted.
Figure 8:
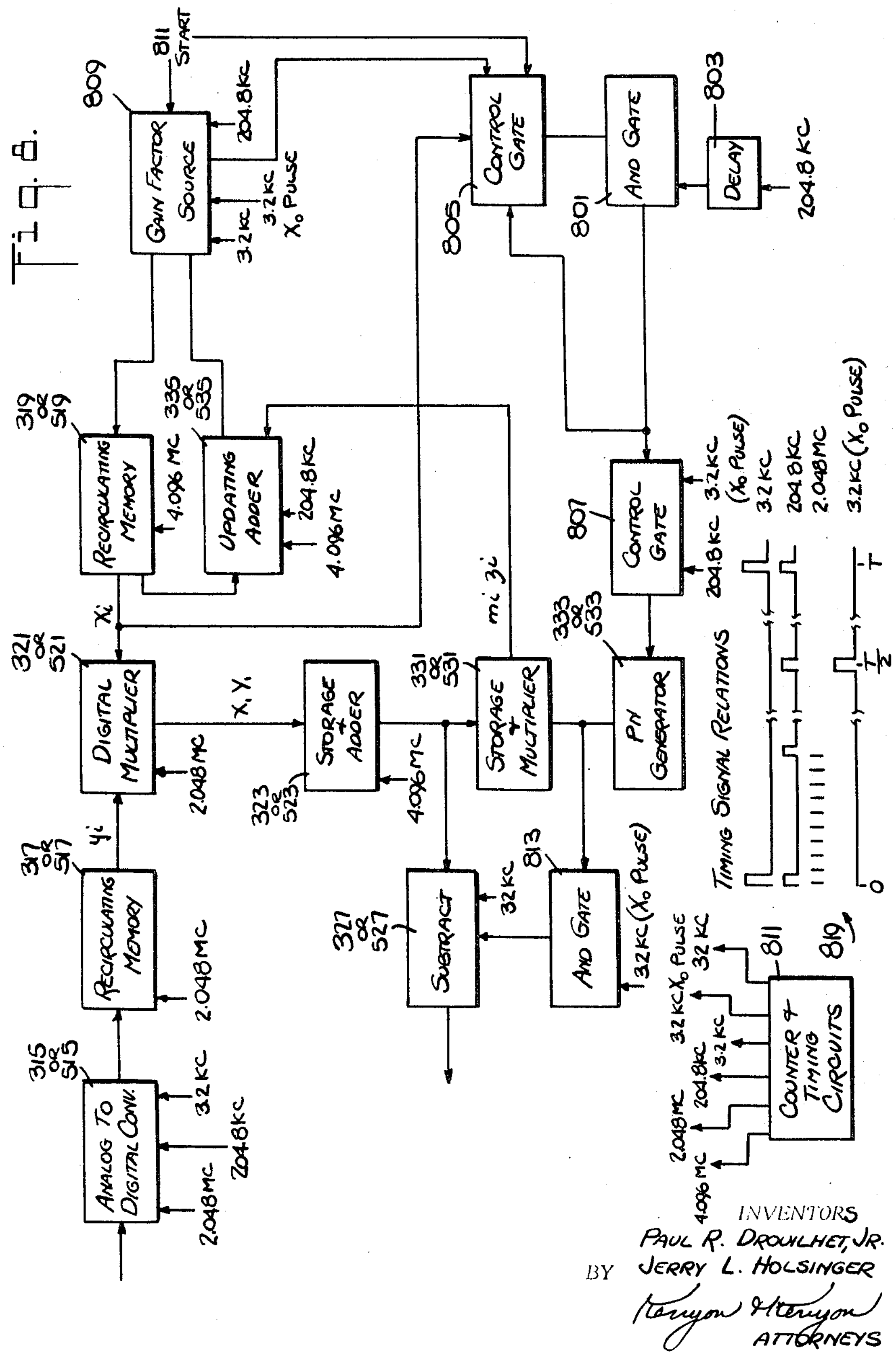

Referring to FIG. 8, the components of an automatic synchronization system are shown as applied to the FIG. 3 embodiment. This figure is also labeled to show these synchronization components applied to the FIGS. 4 and 5 embodiment of the invention. The description of this automatic system for initially achieving synchronization on start up presupposes familiarity with the general method of maintaining synchronizing with manual start up control which is described below with reference to the description of the FIG. 2 system.

A gain factor source is provided at 809. The gains of the recirculating gain memory 319 (or 519, being hereinafter assumed that the synchronization can be applied to either the FIG. 3 or FIG. 5 embodiment of the invention) are circulated according to the teaching of this automatic synchronization invention, not only to or through the updating adder 335 but also through the gain factor source 809. It should be understood that, speaking generally, the gain factor memory 319 holds the gain factors until they are adjusted. More precisely, these gain factors recirculate through the memory, the one emerging after T seconds being reinserted at the beginning. This reinsertion may be thought of in general terms as preceding through the updating adder, that is, it may be adjusted before being reinserted and in this automatic synchronization embodiment, it also may be described as being operated upon by the gain factor source 809.

The gain factor source 809, upon being cycled by a start control 811, operates as follows. The recirculating gain factors are interrupted for a period of T seconds so that the gain factors are all set to zero in the recirculating memory 319 except that at the same time, the gain factor source 809 supplies an initial preset value for $X_0$. This cycling is controlled by a synchronization timing frequency of 3.2 kc., the synchronization of each gain factor number being controlled by a timing frequency of 204.8 kc. The synchronization of the recirculating memory 319, the updating adder 335 and the gain factor source 809 are built into the equipment and according to the preferred embodiment $X_0$ is used to multiply the received pulse sample $Y_i$ when it is halfway through the recirculating memory 317. In other words, the reference gain factor $X_0$ preset is timed by a 3.2 kc. timing frequency which is offset by one-half cycle from the regular 3.2 kc. timing frequency, this regular 3.2 kc. timing frequency being in phase with the other synchronization frequencies supplied by counter and timing circuits 811.

The gain factor source 809 also interrupts the subtract signal to $X_0$, so that during the synchronization operation, it does not cause changes in the gain factors which would confuse the operation of the AND gate 801 which is described below. The $X_0$ subtract is recommenced upon the AND gate's output signal. In addition to presetting the values of the gain factor in the recirculating memory 319, the gain factor source upon cycling closes control gate 805 so that it will supply the gain factor output from the recirculating memory 319 to the AND gate 801.

To understand the operation of the AND gate 801, it is first necessary to understand that the recirculating memory 319, together with the updating adder 335 and the gain factor source 809 handle what may be referred to as a tenbit gain factor number. This ten-bit gain factor number is the number used in multiplying by the digital multiplier 321.

The accumulated $M_iZ_i$ products are stored for use in making adjustment to the gain factors and the incremental adjustments are made to the gain factors only after the random errors caused by the data have averaged, i.e. the two-level sequence has been repeated through a number of cycles so that the effects of all the components in the $Z_i$ except for the component of the particularly positioned pulse in the two-level sequence which it is desired to sum and use to adjust a particular gain factor will have averaged out. A convenient way to accomplish this is to represent the gain factor in the recirculating memory by a 20-bit number, the significant ten bits being used as the gain factors in the multiplications by multiplier 321 and the least significant ten bits being used to accumulate the individual $M_iZ_i$ products, so that only the $M_iZ_i$ products which over an averaging period produce a change which is summed in the ten less significant bits, bits 11–20, to cause a change in the tenth bit, the last bit of the ten more significant bits, effectuates a change in a gain factor being used in the multiplications. It will thus be understood that the gain factor source has set all of the 20-bit gain factors to zero except for that one which has been set to some reasonably large number, which may be taken as approximately equal to a usual $X_0$ gain factor value in operation, except that this preset $X_0$ gain factor value must let the least significant bit of the ten more significant bits be a zero and preferably the ninth and eighth should be zeros as well.

In view of the foregoing, it is apparent that in the first recirculation of the memory 319 the first set of gain factors $X_i$ through the control gate 805 to the AND gate 801 will all have zeros in the least significant bit of the ten more significant bits, there being only these ten bits supplied as gain factors $X_i$.

The AND gate 801 functions to supply an output pulse when signals are simultaneously applied to both its inputs. One of its inputs receives the ten-bit gain factors $X_i$, each of which is received as a sequence ten pulses or lack of pulses depending on whether the bit number is a one or a zero. The other input is a 204.8 kc. timing frequency which is delayed (or advanced) one tenth of a cycle at 803 so that it is in phase with the receipt of the least significant bit place being supplied to the AND gate 801. In short, the AND gate 801 will put out no pulse until some gain factor is changed by an average adjustment building up in the ten least significant bit places until the 10th bit, the least significant bit place in the gain factor is changed to a one, in other words, a pulse.

The receipt of this pulse by the AND gate, this pulse being the first pulse to be received in the tenth and least significant place, will represent a correction which the system intends for $X_0$ but which, since the two-level generator 333 may not be properly synchronized, may be applied elsewhere. The operation of the AND gate provides a basis for computing where the elsewhere is. This operation is as follows.

The output from the AND gate is first supplied to a control gate 805 to open it and stop further delivery of the gain factor to the AND gate 801.

The AND gate 801 also supplies a pulse to a control gate 807. This control gate receives a 204.8 kc. timing signal which is supplied to trigger the successive pulse generations by the fast two-level generator 333.

The phasing of the generator 333 determines where the $X_0$ correction has built up because its pulse sequences are supplied by the updating adder to predetermined gain factors and the particular pulse the two-level generator 333 supplies to the updating adder determines which particular pulse components are picked out of the $Z_i$, all the other randomizing to a small average bias with respect to that pulse.

When the AND gate 801 supplies a pulse to the control gate 807, the control gate acts to interupt the 204.8 kc. timing signal which triggers the output pulse from the fast two-level sequence generator 333 until the control gate 807 receives a pulse of the 3.2 kc. $X_0$ pulse frequency. This causes the two-level generator to delay its sequence until it is in phase. To put it another way, if it is in phase, the output from the AND gate triggering the receipt of the buildup for the $X_0$ and the 3.2 kc. $X_0$ pulse will be received simultaneously and there will be no interruption of the two-level generator or alternatively and depending on construction, there will be an interruption of T seconds to the extent that the pulses are not received simultaneously, the fast two-level generator 333 must be and by the above equipment is delayed.

The slow two-level generators in the embodiments of FIGS. 3 and 5, 325 and 525 respectively, may be separate generators designed and timed to run synchronously with the two-level reference signals that are supplied at the transmitter. Alternatively, and according to a preferred embodiment of the invention, the fast two-level generator 333 or 533 may be used to supply the slow-level sequence as shown in FIG. 8. The output of the generator 333 or 533 is supplied to an AND gate 813 which also receives as a timing pulse, the 3.2 kc. $X_0$ pulse frequency. When the fast two-level generator at this time is a positive pulse, the AND gate supplies a negative pulse to the subtract 327 or 527. Since the fast two-level 333 has been synchronized as described above, the slow two-level sequence put out by the AND gate, one pulse each T seconds, will also be synchronized.

The fast interrelationships of some of the timing pulses in the FIG. 8 synchronization system are indicated generally at 819. The 3.2 kc., 204.8 kc., 2.048 mc. (and 32 kc. and 4.096 mc.) are in phase; the 3.2 kc. $X_0$ pulse is out of phase with the other frequency by one-half its cycle. It should be understood that these interrelationships may be maintained by the counter and timing circuits 811 or they may be adjusted at the component as is convenient.

It should be understood that this two-level sequence might be used in the FIG. 2 embodiment to make possible the rapid transmission of reference or test pulses during the period while the data is interrupted, and consequently, a faster adjustment of equalizer. It will be appreciated that since there is no data during the period of adjustment to the gains in the FIG. 2 embodiment, the averaging need only be over a complete period of the two-level sequence or possibly longer to allow channel noise to average out.

It should also be understood that the widely spaced transmission of test pulses in the FIG. 2 embodiment could be transmitted with the data pulse as shown in the FIG. 3 embodiment. So long as the data pulses are scrambled to radomness, they will over an appropriate period, average to nothing or to a known value which may be biased out. The output from the storage and adder can thus be gated to the recirculating memory just as in FIG. 2 even though data is being transmitted concurrently therewith. These widely spaced test pulses may each be the same.

It will be appreciated that when the data pulses are being applied to the gain corrections, it is desirable to have faster averaging in some applications than can be obtained by sending widely spaced test pulses. Accordingly, the sending of reference pulses with data in many commercial applications will probably be associated with the sending of reference pulses every one or two T seconds by means of the present technique. This would not be so, however, for those applications in which the characteristics of the low pass filter 311 change slowly so that the slow averaging can be tolerated.

It is further understood, of course, that since these correction factors $cZ_i$ are being used to adjust to the gains and since these factors include data pulse components which may average only over a large number of samples, these correction factors should be summed and only the long term averages used to make the adjustments to the gain factor numbers. One means of achieving this in a digital system is to construct the recirculating memory 319 so that the incremental adjustments are not used as gain factors. Instead, they are stored and only the long term sum used, this sum being applied to the gain factor when a predetermined amount has built up. This may be simply accomplished through a digitial system in which the initial places (of less significance) are filled by the incremental adjustments from the updating adder and only as these accumulate are the higher value digits changed, these being the only digits used in the multiplication with the samples from the recirculating sample memory 317.

The output $Z_i$ may be reconverted to analog form in a digitial-to-analog converter 337. Converters of this sort are discussed by Grabbe, Ramo and Wooldridge, supra, at p. 30–05.

The output of the converter 337 may then be descrambled by multiplier-type descrambler 329.

The components of the FIG. 3 embodiment are synchronized in the manner analogous to the synchronization of the FIG. 2 components. The pilot tone is supplied to an analog multiplier 339 which receives the output of a voltage controlled oscillator 341 through a counter 343. The multiplier output is fed through filter 344 to filter out the double frequency and the resulting signal near D.C. is fed to the oscillator to lock it to the phase of the master oscillator and counters of the transmitter.

The oscillator 341 output drives counter and timing circuits 347 which supplies the needed pulses and frequencies for the synchronization of the various components, namely, 4.096 megacycle frequencies for timing the 20 bit digital product numbers with a periodicity of 1/64 T seconds; 2.048 megacycle frequencies for timing the 10 bit digital numbers with a periodicity of 1/64 T seconds, 32 kc. for timing the 10 bit digital number with a periodicity of T, 3.2 kc. for timing events with a periodicity of T.

The sampler in this embodiment is timed as follows. In particular, it is not operated to sample at the peak amplitude of the received pulses. Instead, a 1.6 kc. pilot tone frequency output from counter 343, which has been phase shifted 90° for the purpose of being supplied to the analog multiplier 339, is phase shifted back at 349 to be in phase with that of the received 1.6 kc. pilot frequency. It is then supplied to a zero crossing detector 351 which senses the points at which the pilot tone goes through zero amplitude. At these points a triggering pulse is released to the sampler 313 to cause it to sample. The first, and a minor, advantage of this technique for controlling the sampling is that the sampler samples when the pilot tone is zero and it thus eliminates the need for a filter. It also allows the pilot tone to be placed lower in the spectrum which might be more convenient in some applications. It also allows the data signal band width to be increased since guard space is noter need for this pilot frequency above the signal band width (and below the frequency limit of the connecting link). This advantage is of particular importance when the invention is applied to telephone line links as in the FIGS. 4 and 5 embodiments.

The more significant advantage of this method of sampling is that it solves a problem which has plagued the prior art. The problem is that for some low pass filters containing as a part thereof a phone line, the equalizers as previously used have succeeded in compensating more or less for the data pulse distortion at the tap outputs but they have left and in a sense generated a large problem tail. See Lucky, supra, FIG. 9.

In an embodiment in which the test pulses are widely separated, and a two level sequence of reference pulses is not used, the problem tail appears beyond the samples that are collected for equalization. Then, when the system is thought to be equalized and data is again transmitted, the tail appears on the data to cause error.

This problem is solved in an intuitive way by an operator when the tap gains or gain factors are adjusted manually. The operator observes the output of the test pulses, widely spaced, on a scope and, if a problem tail is present, then he adjusts the gains by trial and error until, while only approximate equalization is obtained throughout the length of the tapped delay line, the problem tail is minimized. This approach is not suitable in application to an automatic system for, first, the automatic system attempts to achieve perfect equalization, and indeed this equalization is desirable throughout the length of the tapped delay line. Second, it would be cumbersome to automate the procedure of sampling the tail of a test pulse outside the length of the line and adjusting the taps so as to strike a good compromise.

In a two level reference pulse system, the tail of a particular pulse in a sequence appears in the next repetition of the sequence, along with the next repetition of that particular pulse in the next sequence and it has been found that, as a general rule, the two level system cannot equalize both large pulses at once.

It has been thought that the problem has been caused by the sampling technique of the prior art which has been to sample at the maximum of the peak pulse generated at the receiver by the transmitted pulse. To sample at the maximum of this peak pulse sometimes is, depending upon the phase distortion of the low pass filter in question, particularly if distortion in the vicinity of the frequency $1/2T$, to sample so as to require that the digital replacement for the tapped delay line equalizer (which is in a sense an inverse low pass filter) to have nearly infiite gain at the frequency $1/2T$. This is physically impossible and it has been found that the problem tail is a result.

The automatic systems of the present invention solve this problem by selecting sampling times by which the tail problem is avoided for all lines in a systematic fashion. These systems operate as follows:

The pilot tone is phase controlled so that its zero cross-over points at the transmitter are in the center of the data pulses. In other words the pilot is phase shifted about a quarter cycle or 90° from the data at the transmitter and if the data has a periodicity of T, the pilot must have a frequency of $1/2T$. This frequency must be exactly $1/2T$ if it is to be transmitted continuously and used to directly control the timing of the samples. (Using a zero crossing detector 351 with a phase shift unit 349 is one way of doing this.) It need only be approximately $1/2T$ if it is to be used to approximate the phase distortion of a $1/2T$ frequency caused by the connecting link and if this information is to be indirectly used to control the phase of the sampler's sampling. This indirect control might be derived from a pilot tone at another frequency, or the carrier recovered by the second FIG. 7 jitter elimination technique in combination with counting and phasing circuits. It is required that the data pulses be generally symmetrical, for example, square pulses, sine waves, etc. for this timing to be most effective.

For the best application to a telephone line, the data and other information for the operation of the digital system is best transmitted on a carrier. An embodiment of this system, shown in FIGS. 4 and 5, requires the follow equipment.

A master oscillator 401 provides a control frequency which may be 6 megacycles that drives counter and timer 403 to give the desired reference tones, 9600 p.p.s., 3.2 kc., 2.5 kc., 1.6 kc. The data source 405 is assumed to supply data in the form of binary bits at a pulse rate of 9600 pulses per second.

These digital pulses are supplied to a scrambler 407. This scrambler is functionally important whenever the data input is a very long series of bits of the same character, all ones, all zeros or, since these bits are to be converted to analog form in groups of three, a long series in which the same group of three is repeated, for example, 101, 101, etc. Any repeated group of three bits would cause the same analog form to be repeated. In general, there will be many applications where large numbers of bits of the same type will be fed in sequence as input data. This might occur where the input data corresponds to pictures being scanned. Large white or black areas would produce vast numbers of input bits of exactly the same type.

When a long stream of bits or analog forms of the same character are repeated, certain problems occur for reasons that are explained elsewhere. But in brief, an ambiguity results from the fact that if there is not a random-like distribution of data pulses being transmitted, there may not be sufficient average carrier level at the receiver to permit the phase of the carrier to be tracked so as to properly control the balanced demodulator. It should be understood that because of power limitations, it is desirable to have as little average power in the carrier as possible so there can be as much in the signal pulses as possible and therefore the small amount of power that is in the carrier must have a fairly constant short term average. The scrambler is also important in the first described variation to make sure that the data pulses as average to a known average value that can be subtracted out in the equalizer by being set off against the average leftover value of the pulse products obtained with the fast two-level sequence each P so that the data and leftover values are eliminated from the reference pulses which, alone, are of a predetermined fixed reference amplitude and which along should be used to adjust the gain settings in the equalizer.

The scrambler 407 is essentially an exclusive OR circuit. Its function is to convert certain of the bits in the input data to their complements. Thus according to a predetermined known pattern, which may be a two-level sequence of pulses, the scrambler converts the selected bits from either ones to zeros or from zeros to ones, depending upon which the bit is, in accordance with the predetermined pattern. In other words, the scrambler 407 converts certain of the bits (or pulse forms) of the same character to bits (or pulse forms) of the opposite character thereby assuring that the input data will never be a very long series of bits (or pulses) of exactly the same type. See Grabbe, Ramo and Wooldridge, supra, p. 17–05.

Three binary bits may be conveniently scrambled at once by the scrambler. These three bits need not be selected so that, once scrambled, they will be encoded on the same amplitude modulated pulse but the scrambler and the descrambler must be synchronized. Moreover, the data could be encoded as an amplitude modulated pulse by the digital-to-analog converter and the amplitudes of these pulses could then be scrambled by a multiplier-type scrambler.

The pattern by which the scrambler operates may be determined by a two-level sequence generator 408 which has a period incommensurate with the period of the two-level reference pulse generator 409. By known predetermined fashion which can be matched by another generator in the receiver so that appropriate descrambling can occur.

Since the scrambler is operated in accordance with a pattern dictated by a two-level sequence generator 408, there is virtually on chance of the scrambler output ever being a long train of bits of the same character, unless the input data is itself from an identical generator.

The reference two-level sequence generator 409 supplies a reference pulse to the adder 411 at a pulse rate of one every T seconds, T equals 1/3200 second.

The output from the scrambler 407 is fed to a digital-to-analog converter 410 once every T seconds. This converter, like the one described in Grabbe, Ramo, and Wooldridge, supra, at p. 30–05, converts the information carried by the input bits to discrete pulse levels. The output of the converter 410 is preferably a series of immediately adjacent pulses, each pulse having a height dictated by a span of input bits. If there are eight discrete amplitude heights (ranging from minus to plus) which each pulse can have within the power input that can be accepted by the phone link and still be accurately deciphered at the receiver, each three input bits can be encoded as the height of a single pulse. In other words, three bits of information can be carried by a single pulse and by this technique the rate at which information is carried is increased. However, the use of a pulse height encoded system requires a very accurate transmission so that each received pulse cannot only be clearly distinguished from an adjacent received pulse but can also be accurately measured as to its height. The less distortion that occurs in the transmission or, alternatively, the greater the compensation at the receiver for the distortion in the transmission, the more discrete pulse levels can be used and the greater the information rate at which information can be transmitted.

The adder 411 adds the pilot tone, the data pulse input and the reference pulse input to produce a pulse-like signal having as its amplitude at any instant the sum of the amplitudes of the components at that instant.

A sharp cut-off linear phase low pass filter 413 receives the output of the adder 411 and supplies it to a balanced modulator 415. It is important that the filter 413 be a linear phase filter so as not to introduce phase distortion in the data being transmitted, which would tend to limit the phase distortion that could be tolerated on the phone line. If the total distortion encountered at the receiver is not so bad that pulses are beyond recognition and compensation at the receiver, the equalizer will compensate for distortion caused by the various filters and components as well as for that caused by the connecting link. It is further important that the filter 413 have a sharp upper cut-off point because it is desired to supply as much of the total data pulse spectrum energy to a balanced modulator as is possible without supplying frequencies too high to be modulated on the carrier. The carrier is selected at as high a frequency as possible for telephone line transmission. Since single side band transmission over the telephone line will be employed, and according to a refined embodiment by which a pilot tone is transmitted just above the carrier, the carrier is about 2.5 kc. Although this filter 413 gives not only a narrow band width but a longer pulse, the pulse length created can be tolerated.

The design of sharp cut-off linear phase filters is known but they are expensive to manufacture. For reasons of economy it is thus preferred to follow the design techniques taught by Lerner in his article, "Band Pass Filters With Linear Phase," Proceedings of the I.E.E.E., March 1964, pp. 249–268.

A balanced modulator 415 serves the function of modulating the data signal pulses (which it might be noted have been randomized by the scrambler 407); the pilot tone for AGC control, timing, and sample phasing; and the reference signal pulses onto a carrier, the carrier being normally within the range of two and a half kc. to three kc. for use with telephone or cable circuits. The carrier signal is derived from the timing counters 403. For a discussion of balanced modulators, see Landee, Davis & Albrecht, Electronic Designers Handbook, McGraw-Hill, Inc. (1957), pp. 5–25.

Balanced modulators inherently suppress the carrier, and yet the carrier in this case must be recoverable at the receiver in order to control the balanced demodulator at the exact frequency which the carrier has at the receiver. This frequency will vary slightly but significantly due to the phone system multiplexing, etc.

To ensure that there is sufficient carrier data at the receiver to permit its recovery for this purpose, the data for this embodiment of the invention in which carrier is used must have in its analog form a non-zero D.C. level.

It is necessary to modulate the information onto a carrier if it is desired to transmit over the telephone line because the telephone line has a band pass within which it is necessary to transmit and thus the output of the low pass filter 413 has to be stepped up to a frequency band within the band pass range of the telephone system. The modulator-demodulator system and phone line of this FIGS. 4 and 5 embodiment is generally analogous to the low pass filters 109, 209 and 311.

The output of the modulator 415 is passed through a sharp cut-off linear phase band pass filter 417 so as to transmit only one sideband, in this case the lower sideband, to the telephone line.

More generally, the band pass filter 417 must have relatively sharp cut-off so that the input signal being fed to the telephone line has no frequencies outside of the telephone line band pass. This is important not only because of telephone companies' insistence that signals be within the band pass but because signals having frequencies outside of the band pass tend to produce cross talk and other problems in the system, some of which may interfere with the data transmission. At the same time, and since the faster the pulse rate the wider the pulse bandwidth, it is desirable to make the cut-off band pass filter 417 sharp to limit the bandwidth that may be transmitted as little as possible while still effectively cutting off all frequencies outside of the telephone band pass.

As is true with the sharp cut-off linear phase low pass filter 413, this sharp cut-off linear phase band pass filter 417 is normally an expensive item to design and build. Accordingly, it is preferred that the filter 417 like the filter 413 be designed in accordance with the teachings of Lerner in his article cited above.

An impedance match (not shown) is used to match the output of the filter 417 to the impedance of the phone line 419. On the receiver end, a similar impedance match would normally be incorporated.

At the receiver, after impedance matching, a sharp cut-off linear phase band pass filter 501 is employed to eliminate noise and other irrelevant phone line output that is outside of the band of frequencies carrying the transmitted information.

The filter 501 output is amplified by an amplifier 503 that has an automatic gain control feature to correct gross distortion in amplitude to provide a suitable signal amplitude for demodulation by a balanced demodulator 505 and to insure that the signal amplitude reaching the analog-to-digital converter 515 will be sufficiently high to permit good resolution by the analog-to-digital converter. In other words, the particular digital converter used has a ten bit capacity which enables it to encode an analog pulse as any one of 1024 digital values. The received signal should be amplified so that the range of pulse levels received covers most of the range of digital values. On the other hand, if the pulse level falls too low, and is bunched at the bottom end of the range of the converter, there will be only a relatively small number of the over 1000 potential levels available to resolve the differences in pulse amplitude.

A narrow band pass filter 513 has a band pass sufficiently narrow to pick out the pilot tone from the demodulated output of the low pass filter 507. This pilot tone is then detected by an envelope detector 516 and then fed through a low pass filter also shown at 516 to bias the AGC amplifier 503 in a direction and to an amount necessary to maintain the output of the demodulator at a reasonably constant amplitude. This can only be an approximate adjustment, however, since the AGC amplifies the input to maintain a reasonably constant level of pilot tone frequency. The other frequencies present in the data and references pulses may be attenuated more or less than the pilot tone and consequently the final and accurate amplitude or system gain control is achieved by the gains of the recirculating gain memory, there being an amplitude reference value subtracted from the adjustment to a reference gain, as described elsewhere.

A balanced demodulator 505 steps down from the data and reference pulse information from a frequency range in the band pass of the filter of the telephone system to the low frequency range which it initially had at the transmitter before modulation.

A phase locked loop including an analog multiplier 517, a filter 519, and a voltage controlled oscillator 521 having the carrier frequency as its center frequency extracts the carrier frequency from the output of amplifier 503 so as to accomplish balanced demodulation at that frequency.

The importance of providing a means such as a phase locked loop for recovering the carrier signal from the input to the demodulator 505 rather than generating a carrier signal locally that would be equal in frequency to the carrier generated at the transmitter rests in the fact that the telephone system transmission techniques frequently operate in such a fashion as to cause a shift in the frequency of the carrier being transmitted. For example, in the course of transmission through the phone system, the signals are sometimes modulated on various carriers and then demodulated at remote locations from the modulation point by demodulators whose frequency is not accurately fixed to the modulator frequencies. This introduces a frequency shift which, though it is ordinarily only a few cycles per second and seldom runs to more than 20 c.p.s., would result in considerable distortion of the data signal as it is received as compared to the sensitivity of the receiver according to this invention if the data signal were recovered by a demodulator operating on a carrier frequency that was not adjusted to reflect the frequency shift.

In general, the phase locked loop for carrier recovery operates similarly to the phase locked loops for pilot tone, recovery, which are described elsewhere. Any frequency offset in the carrier will be reflected as a frequency offset in the derived carrier signal for the balanced demodulator and the output of the demodulator will not be distorted by virtue of being run at a frequency which is other than the center frequency for the band of data being transmitted.

In particular, the voltage controlled oscillator of the phase locked loop is built to have a center frequency equal to the carrier frequency of 2.5 kc. The output of the AGC amplifier and the output of the voltage controlled oscillator are multiplied by the multiplier to provide a fairly complex product which includes a "D.C." signal having a magnitude equal to the difference in phase between the output of the voltage controlled oscillator and the carrier signal from the AGC amplifier. The signal is called D.C. because its rate of change of phase is so slow as compared to the frequency of the oscillator. This D.C. signal is passed through a very low pass filter to provide a control signal for the voltage controlled oscillator which control signal operates to cause output of the oscillator to be equal in frequency to the carrier signal and to be displaced in phase from it by only enough to permit the error to be detected. If the carrier signal drifts off of 2.5 kc. by a fraction of a cycle, then the output of the multiplier will reflect this in signal proportional to the error.

The phase locked loop comprising an analog multiplier 517, a loop filter 519 and a voltage controlled oscillator 521 desirably has a narrow band width, i.e., a slow period of response. This is because the data band width includes the carrier frequency and thus data frequency components may be surrounding and even over it and a phase locked loop which has a band pass of more than a few cycles may pick up enough data frequency components so as to cause undesirable variations in the frequency of the output of the voltage controlled oscillator. In other words, the data signal frequencies which are close to the carrier signal will be transmitted by the analog multiplier as signals having a very low frequency. To the extent that the loop filter passes these signals, they will be applied to the voltage controlled oscillator to vary the output of the voltage controlled oscillator in a fashion other than that dictated by the changing phase of carrier frequency itself. The problem is substantially eliminated by using a very narrow band filter 519 for a very narrow phase locked loop with a band width in the order of .1 c.p.s. and with a period of response fast enough to track the drift in carrier frequencies but too slow to track the fast changes of the data.

Ideally, this phase lock loop would track the carrier frequency, that is, the carrier would be multiplied by the phase offset center frequency of the voltage controlled oscillator 521 in the analog multiplier 517 the output being sent to the loop filter 519 and the resulting "D.C." supplied to control the voltage controlled oscillator. The oscillator, thus locked to the phase of the carrier being supplied to the balanced demodulator, would supply a signal to the demodulator for demodulation at that frequency.

Figure 5:
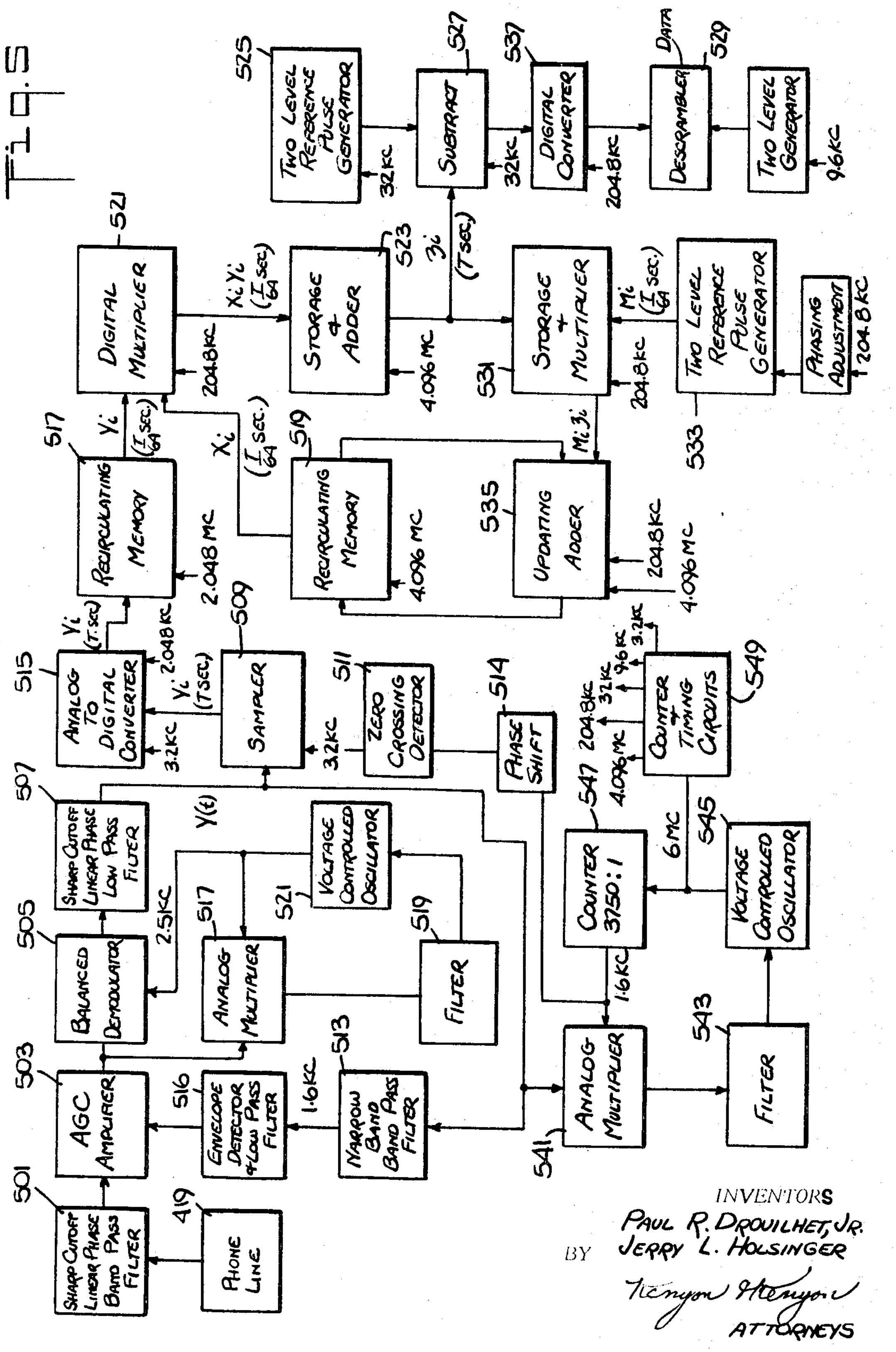

Unfortunately, two problems arise with a very narrow band phase locked loop as shown in the FIG. 5 embodiment. The first problem is that if the carrier signal has been shifted by the phone link more than a couple of cycles from the center frequency of the voltage controlled oscillator, then the phase locked loop will not latch onto the carrier. It might be pointed out that once the phase locked loop has latched onto the carrier, then it will track with the carrier over a much wider range of frequencies than the normal frequency band of the phase locked loop. But there remains the problem of initially latching onto a carrier frequency that comes through initially displaced more than a couple of cycles from the center frequency of the voltage controlled oscillator.

A second problem arises out of the fact that it has been found that the carrier frequency itself jumps a few cycles at a time at a fast rate, that is, the carrier frequency not only drifts at a relatively slow rate, which slow rate can be tracked by the voltage controlled oscillator once the voltage controlled oscillator has latched onto that frequency, but also jitters. This jitter is presumably due to instabilities in the various oscillators employed in the modulators and demodulators within the phone link. Since the phase locked loop must have a narrow band width to filter out the data frequency components it will also filter out the jitter frequency components or, in other words, it won't track the jitter. That is, as the 2.5 kc. carrier signal jitters about its desired frequency due to the various instabilities within the oscillators and other elements of the phone link, a signal is generated at the output of the analog multiplier 517 of the phase locked loop which has a frequency that corresponds to the jitter rate. The loop filter 519 of the very narrow band phase locked loop is a low pass filter having a very narrow band pass, preferably in the order of 0.1 c.p.s. The loop filter is thus perfectly adequate to permit the voltage controlled oscillator to track with slow changes in carrier signal frequency since the only difference between the voltage controlled oscillator output frequency and the carrier signal frequency will then be a phase difference with the result that the multiplier output will be a "D.C." signal that varies at some very slow rate, which rate is equal to the rate at which the carrier frequency shifts. However, when the carrier frequency shifts at any fast rate, that is jitters, the output of the multiplier circuit will be a frequency which will be blocked by the extremely narrow band loop filter and thus will not be applied to the voltage controlled oscillator. Accordingly, the output of the VCO will not track with the jitter signal.

As explained above, in order to provide the most accurate detection of the pulse data, it is desirable that the control frequency applied to the balanced demodulator track both the slow drift and the fast jitter of the carrier about which it is to demodulate. Otherwise, there will be distortion noise from the output of the demodulator which is too fast to be properly compensated for by the adaptive equalizer which can follow drift in phase distortion, but not jitter, and which may therefore cause intersymbol interference.

In order to have the phase locked loop provide an output signal for the balanced demodulator which does track the jittering of the carrier frequency, it is necessary to have a much wider band phase locked loop. But as has been described, this wider band phase locked loop cannot be used as shown in FIG. 5 because it will pick up too much of the data signal frequencies and thus apply a control signal to the voltage controlled oscillator that is irrelevant to the carrier signal frequency. Accordingly, the output of the voltage controlled oscillator will not be identical with the output carrier signal frequency and the balanced demodulator will not operate at optimum performance to provide output signals having minimum distortion.

Figure 6:
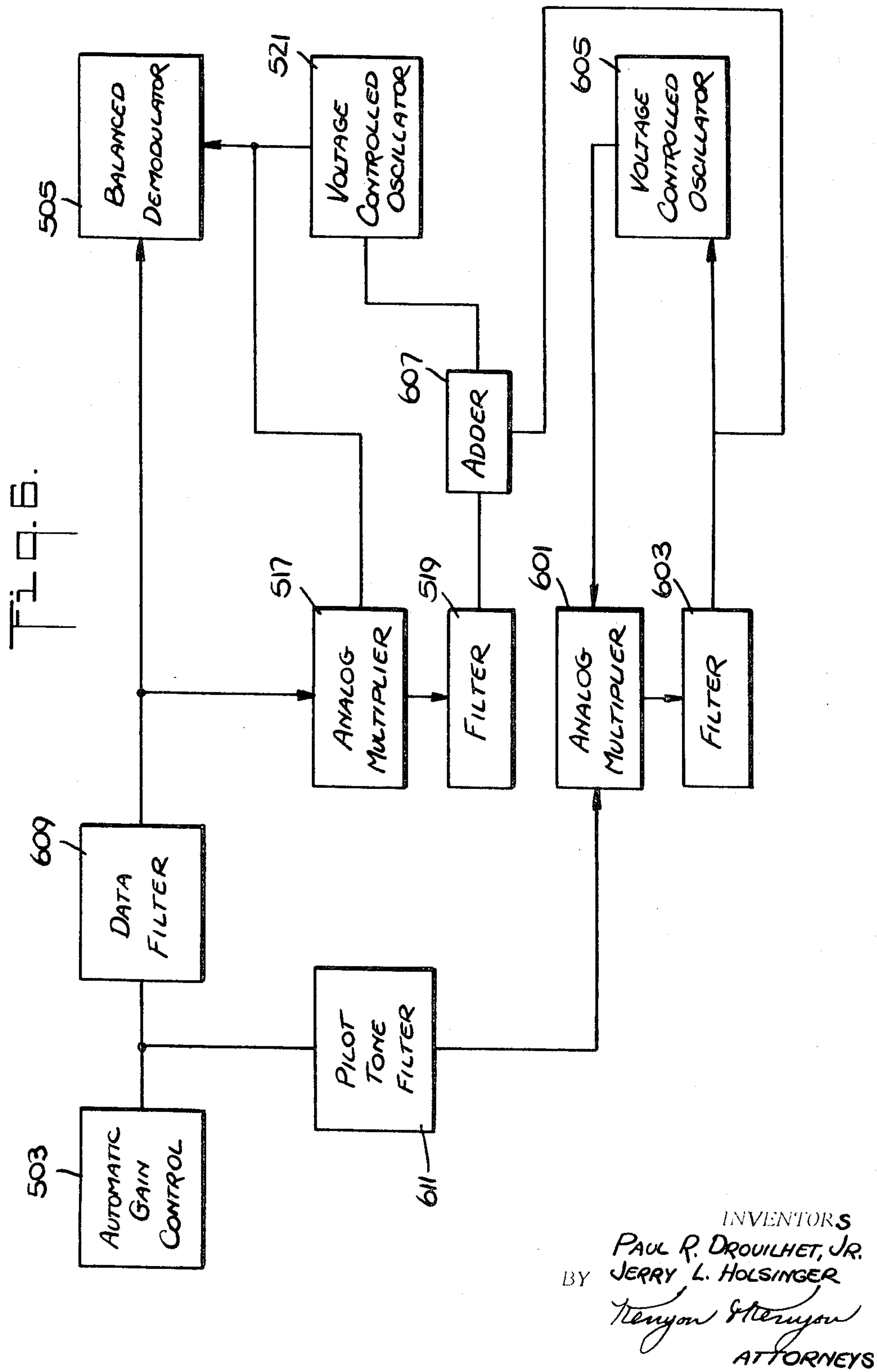
FIGS. 6, 7 and 8 are block diagrams that show alternative circuits for portions of the FIG. 5 receiver.

One solution to the problem is shown in FIG. 6. By this technique, to be described in connection with the system of FIGS. 4 and 5, a second pilot tone (or third pilot tone, since the carrier could also be regarded and/or used as a pilot tone) must be transmitted as a second reference carrier. This pilot tone, which we will call herein a jitter pilot tone, is at the upper frequency limit of the phone system, say 2.8 kc., and is sufficiently removed from the carrier frequency of 2.5 kc. so as to be outside of the data frequency band. Since the jitter pilot tone is outside of the data frequency band, a relatively wide band and fast response phase locked loop can be employed to track the jitter pilot tone. Such a phase lock loop is shown in FIG. 6 with analog multiplier 601, filter 603 and voltage controlled oscillator 605. The voltage controlled oscillator 605 in the relatively wide band (for example, 20 cycle band width) phase locked loop has as its center frequency the jitter pilot tone frequency of 2.8 kc. Since the output of the multiplier which represents the effects of jitter will be passed by the loop filter to provide a voltage controlled oscillator output that tracks jitter, this phase locked loop will not only latch onto the jitter control tone when the jitter control tone is displaced by as much as 20 cycles from the 2.8 kc. generated at the transmitter but will also respond to the jitter frequency that is generated in the telephone link. Accordingly, the voltage at the output of the loop filter 603 of this wide band phase locked loop will vary as required to cause the VCO 605 to vary with the jitter frequency.

At this point, it must be appreciated that the jitter imposed by the telephone link on the 2.8 kc. jitter control tone is virtually identical with the jitter imposed on the 2.5 kc. carrier signal. Thus, the output voltage from the loop filter 603 in the wide band phase locked loop can be added with proper gain control by adder 607 to the output voltage from the loop filter 519 in the narrow band phase locked loop to apply a net voltage to the voltage controlled oscillator 521 in the narrow band phase locked loop that has a component which tracks with the jitter as well as the component necessary to track with the drift in the carrier frequency. Thus, the first voltage controlled oscillator 521 will have a center frequency of 2.5 kc. and will vary about that center frequency not only as the carrier frequency slowly varies with time over a number of cycles but will also vary as the carrier frequency jitters rapidly over a few cycles. For this use of the phase locked loops, the gain constant $k_1$ of the voltage controlled oscillator 521 and the gain constant $k_2$ of the voltage controlled oscillator 605 should be such that their product is 1, i.e., $k_1k_2=1$.

It should be understood that a data filter 609 is needed to filter the signal supplied to the demodulator and it is preferably used before the input to the analog multiplier 517. A pilot tone filter is used before analog multiplier 607, primarily to change the phase of this tone by the same amount that the data filter has changed the phase of the carrier.

Figure 7:
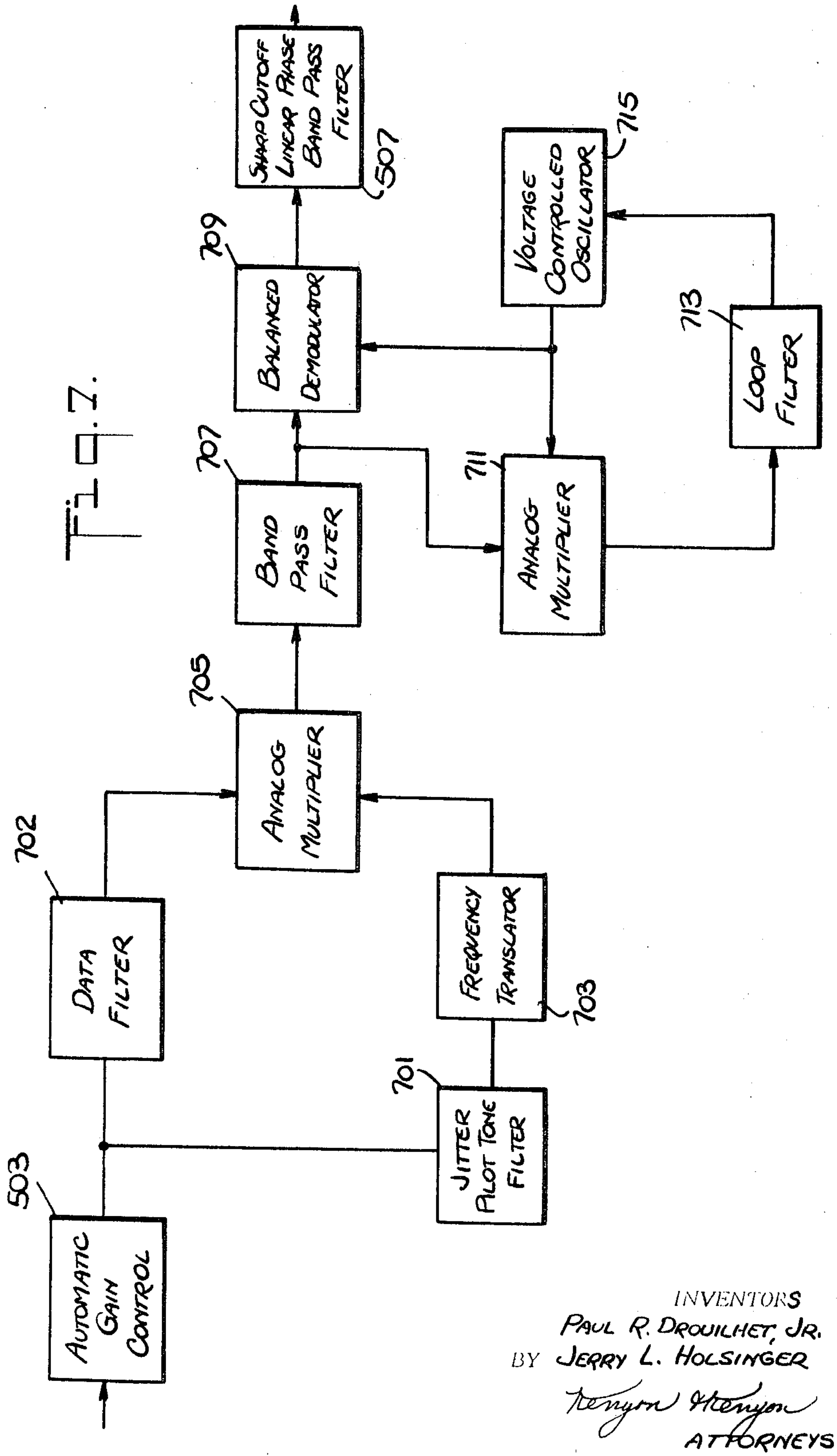

A second method for demodulating the information carried on a carrier whose frequency is subject to the rapid jitter variations is as follows. With reference to FIG. 7, the output from the automatic gain control amplifier 503 is supplied through a pilot tone filter 701 to a frequency translator 703 of known construction. This translator increases the frequency of the 2.8 jitter pilot tone to any convenient frequency, for example, 6 kc.

The 6 kc. output from the frequency translator is supplied to an analog multiplier 705. The carrier frequency from the AGC 503 is supplied through a data filter 702 and to this multiplier 705. The output product of the multiplier is found to have frequency components, one of which contains the sum of the carrier with its jitter distortion and the frequency translation frequency with its jitter distortion and the other of which contains the difference of those same things. Since the phase or jitter distortions are substantially the same in the carrier and the translated frequency 6 kc., the difference of the distortions is zero and the term which contains the difference is passed by band pass filter 707 to provide what may be called a second carrier, in this case 3.5 kc. It will be apparent that this product of the multiplier will also be at a constant frequency, any shift in the carrier frequency and the pilot tone frequency will also have been eliminated just as the jitter is eliminated. Because of this, the 3.5 kc. carrier is jitterless and shiftless and may be demodulated by conventional application of a narrow band phase locked loop control balanced demodulator 709, the phase locked loop being comprised of analog multiplier 711, loop filter 713 and VCO 715.

Because the jitter and frequency error are eliminated from the carrier used for the demodulation by this second method, it may be used in place of a pilot tone for timing the operation of the various components in the receiver. In other words, this carrier could be supplied to the analog multiplier 541 so as to control the phase locked loop which runs the countertiming circuits 549. If pulse distortion of a $1/2T$ frequency by the low pass filter is computed initially, and the phasing of the sampler thus calculated initially, the synchronization of a thus phased sampler could depend on the carrier recovered by this means.

The output from the balanced demodulator 505 is fed to a sharp cutoff linear phase low pass filter 507 to eliminate double frequency components from the demodulator. This filter 507 would have its sharp cutoff just above the $1/2T$ sequence.

The output from the sharp cutoff linear phase low pass filter 507 is fed to a sampler 509. This sampler is like sampler 313 and its operation is to sample the continuous input $Y_t$ once every T seconds. It may be controlled through a zero crossing detector 511 and a phase shift unit 514 in a manner analogous to the way in which sampler 313 is controlled by zero crossing detector 315 and phase shift unit 349.

It will be understood that if there were no phase distortion over the line link, the output $Y_i$ from the sampler every T seconds would correspond to the amplitude of the pulse originally transmitted and it would only be necessary to descramble, subtract the reference pulse amplitude, and convert to binary bit form in order to have completed the transmission. But the distortion introduced by the telephone line makes this impossible and the remaining portion of the receiver in the embodiment of FIG. 5 is analogous to the FIG. 3 embodiment.

In brief, the output from the sampler 509 is fed to a digital analog converter 515 analogous to the digital analog converter 315.

The digitized samples are supplied to a recirculating sample memory 517, analogous to the recirculating memory 317.

This memory operates with the periodicity of $\frac{1}{64}$ T seconds to supply 63 $Y_i$ samples to the digital multiplier 521, analogous to the digital multiplier 321, every T seconds. A recirculating gain memory, 519, analogous to the recirculating memory 319, supplies 63 gain factors in T seconds with the periodicity of one pulse each $\frac{1}{64}$ T seconds to the digital multiplier 521, these gain factors being supplied in synchronization with the $Y_i$ samples from the recirculating memory 517.

The product, $X_i$ $Y_i$ is supplied with the periodicity of $\frac{1}{64}$ T seconds to a storage and adding unit 523 analogous to the storage and adder 323.

The output $Z_i$ from the storage and adder is supplied with the periodicity of T seconds to a storage and multiplier 531 analogous to the storage and multiplier 331. A fast reference pulse generator 533, analogous to fast pulse generator 333, supplies a reproduction of the two level sequence of reference pulses to the multiplier 531 at a pulse rate 64 times as fast as they are transmitted.

The multiplier pulse outputs, $M_i$ $Z_i$ are supplied with a periodicity of $\frac{1}{64}$ T seconds to an updating adder 535 which adds them to the appropriate gain factor in the recirculating memory 519 in a manner analogous to the operation of updating adder 335 and which may be initially synchronized in the manner described supra in connection with FIGURE 8.

The output of the storage added 523 is also supplied to a subtract unit 527, analogous to the subtract unit 327, which is synchronized by a reference pulse generator 525, analogous to 325, and which operates to subtract out the reference pulses from the data.

The subtractor 527 output is converted to 3 bit digital form by a digital 10 bit to digital 3 bit converter 537 and descrambled by descrambler 529.

The timing circuits operate in a manner analogous to that shown and described for the FIG. 3 embodiment for the invention. A phase locked loop comprising analog multiplier 541, a loop filter 543, a voltage controlled oscillator 545 and counter timing circuits 547 and 549 provide for recovery of the pilot tone, for tracking its phase and for supplying frequencies for 4.096 mc., 204.8 kc. and 3.2 kc. frequencies for timing control and synchronization.

The invention has been described above primarily as respects the transmission of amplitude pulses that have been modulated to discreet amplitude levels, each level being susceptible of translation to a digital value. There are other applications in which it is desirable to transmit a pulse whose amplitude is continuously variable as, for example, in television or other facsimile reproduction techniques, and this system may be used in connection with such transmissions to ensure that the pulse amplitudes, whatever they are, are received without distortion and the use of this system for such transmissions makes it possible to use connecting links of poorer characteristics than could be used without this compensation for pulse distortion. This present system is valuable for television and facsimile applications because of the fact that the equalizer is an inverse filter in the sense that it makes each output sample $Z_i$ correspond to a single input or transmitted pulse. If the signal to be transmitted has a generally known wave form, as, for example, that from a television camera, this signal can be sampled, and the sample signal transmitted as a pulse of a particular modulation, received and the distortion compensated for, and then the original signal reconstituted in accordance with the known wave form.

The invention has been described above in preferred embodiments; other applications of the invention will be apparent to those skilled in the art in view of the discussion above.

It should be understood that the data pulse rate is chosen for the preferred embodiment at about 3200 pulses per second because this is the fastest pulse rate that can be used with a wide variety of ordinary telephone lines. The system itself can be used on some lines, selected for their favorable lack of phase and other pulse distortion, to transmit pulse rates up to about 4800 pulses per second which is approximately the limitation imposed by the band width of the telephone system.

We claim:

1. In a data transmission system including a transmitter for transmitting data pulses at a regular rate of one pulse each T seconds and also for transmitting reference pulses through a low pass filter over a distance and a receiver for receiving an output from the filter caused by said transmissions, the improvement in the receiver of an equalizer comprising:

a tapped delay line adapted to receive the output caused by a reference pulse signal transmitted through a low pass filter, said delay line having a plurality of output taps including a reference tap $X_0$, a plurality of variable gain means to vary the amplitude of the outputs of said taps, each of said variable gain means being coupled to a different output tap and the gain of each of said variable gain means being controlled by a separate control signal amplitude, a summation output connected to sum the outputs of said variable gain means, a sampler coupled to the summation output of said variable gain means to sample said summation output once each T seconds to provide a sequence of control signal output amplitudes, dividing means to reduce each of said sequence of control signal output amplitudes by a uniform factor, connection means to apply sequential ones of said proportionally reduced sequence of control signal output amplitudes to sequential ones of the sequence of variable gain means to vary the gain of each of said means in direct proportion to the value of the one of said control signal output amplitudes being applied, except that a predetermined reference value is subtracted from the proportionally reduced control signal output amplitude to be applied to the gain of the one of said variable gain means that is coupled to said reference tap $X_0$, synchronization means to cause the connection means to apply the sequence of proportionally reduced control signal output amplitudes to the variable gain means so that the output amplitude which includes the product of the peak pulse of the received signal caused by a transmission of a reference pulse and the gain of the variable gain means coupled to the reference tap $X_0$ is applied to adjust gain of the variable gain means coupled to that reference tap $X_0$, and so that the other variable gain means are correspondingly adjusted by the sequence of proportionally reduced output amplitudes.

2. The equalizer of claim 1 in which said connection means include:

storage means for receiving said sequence of control signal output amplitudes and storing them until as many output amplitudes have been received as there are taps in the tapped delay line, series to parallel converter means for then applying the received series sequence of control signal output amplitudes to the corresponding sequence of variable gain means.

3. In a data transmission system for transmitting data pulses at a regular rate of one pulse each T seconds, said system including a transmitter for transmitting data and reference pulses over a distance and through a filter and a receiver for receiving the signal caused at the receiver by the transmission of said pulses, the improvement in the receiver of an equalizer comprising:

a tapped delay line adapted to receive an output signal from the filter and having a plurality of output taps including a reference tap $X_0$, a plurality of variable gain means to vary the amplitude of the outputs from said taps, each of said variable gain means being coupled to a different output tap and the gain of each of said variable gain means being adjustable by a different control signal amplitude, a summation output connected to sum the outputs of said variable gain means, a sampler coupled to the summation output of said plurality of variable gain means to sample said summation output once each T seconds to provide a sequence of control signal output amplitudes, synchronization means for operating said sampler to sample said data pulses at the approximate time of the maximum amplitude of the $1/2T$ frequency component in the data pulses being sampled, $1/T$ being the frequency at which the data pulses are being transmitted, connection means to apply sequential ones of said sequence of control signal output amplitudes to sequential ones of the sequence of variable gain means to vary the gain of each of said means in direct proportion to the value of the one of said control signal output amplitudes being applied, except that the gain of the one of said variable gain means that is coupled to said reference tap $X_0$ is varied in direct proportion to the value of the corresponding control signal output amplitude less a predetermined reference value, synchronization means to cause the connection means to apply the sequence of control signal output amplitudes to the variable gain means so that the control signal output amplitude from the time when the peak pulse of the received signal caused by a transmission of a reference pulse appeared at the reference tap $X_0$ is applied to adjust the gain of the variable gain means coupled to that reference tap $X_0$.

4. A data transmission system for transmitting data pulses at the regular rate of one pulse each T seconds, said system comprising:

a transmitter for transmitting data pulses once every T seconds and for simultaneously transmitting a pilot tone with the frequency of $1/2T$, said pilot tone being about a quarter cycle out of phase with the data pulses, a connecting link having the characteristics of a low pass filter, a receiver for receiving said transmissions, a tapped delay line adapted to receive an output signal from the low pass filter and having a plurality of output taps including a reference tap $X_0$, a plurality of variable gain means to vary the amplitude of the outputs of said taps, each of said variable gain means being coupled to a separate output tap and the gain of each of said variable gain means being controlled by a separate control signal amplitude, a summation output connected to sum the outputs of said variable gain means, a sampler coupled to the summation output of said plurality of variable gain means to sample said summation output once each T seconds to provide a sequence of control signal output amplitudes, timing means for receiving the pilot tone of $1/2T$ frequency and for causing said sampler to sample at the approximate end of every one-half cycle of said pilot tone, connection means to apply sequential ones of said sequence of control signal output amplitudes to sequential ones of the sequence of variable gain means to vary the gain of each of said means in direct proportion to the value of the one of said control signal output amplitudes being applied, except that the gain of the one of said variable gain means that is coupled to said reference tap $X_0$ is varied in direct proportion to the value of the corresponding control signal output amplitude less a predetermined reference value, synchronization means to cause the connection means to apply the sequence of control signal output amplitudes to the variable gain means so that the control signal output amplitude from the time when the peak pulse of the received signal caused by a transmission of a reference pulse appeared at the reference tap $X_0$ is applied to adjust the gain of the variable gain means coupled to that reference tap $X_0$.

5. In a data transmission system including a transmitter for transmitting data pulses at the rate of one data pulse each T seconds through a telephone line or similar connecting link and a receiver for receiving the output caused by said transmissions at the end of the line, said transmitter also being for transmitting reference pulses and said receiver also being for receiving the output caused at the end of the line by the transmission of such reference pulses, the improvement in the receiver of an adaptive equalizer comprising:

a sampler adapted to receive the pulse output amplitude from said transmissions and to produce a sample of said amplitude each T seconds so as to provide a sequence of pulse output amplitudes, one of said amplitudes for each of said transmissions being a peak received amplitude, an analog to digital converter for representing the pulse output amplitudes in digital coding, a recirculating digital sample memory means for storing $n$ of said sequence of pulse output amplitudes, said memory means replacing the oldest amplitude with the most recently received amplitude once each T seconds, a recirculating digital gain memory means for storing a sequence of $n$ gain factors, one of these factors being a reference gain factor $X_0$, a multiplier for receiving the stored sequence of pulse output amplitudes from the sample memory means and the sequence of gain factors from the gain memory means and for multiplying each data pulse output amplitude together with a different gain factor at a rate such that each output amplitude has been multiplied by some gain factor each T seconds and so that, once each $n$ T seconds, some pulse output amplitude has been multiplied by all $n$ gain factors, it having been multiplied by a different gain factor for each T of the $n$ T period, all to provide a sequence of $n$ multiplier output amplitudes each T seconds, adder means for summing $n$ multiplier output amplitudes each T seconds to provide a sequence of $n$ summed gain factor amplitudes each $n$ T seconds, a divider for proportionally reducing each of said summed gain factor amplitudes so as to provide a sequence of proportionally reduced amplitudes, connection means for applying sequential ones of said sequence of proportionally reduced amplitudes to sequential ones of said sequence of $n$ gain factors in said gain memory, except that the proportionally reduced amplitude to be applied to the reference gain factor $X_0$ is first reduced by a predetermined reference value, synchronization means controlling said connection means so that the sequence of proportionally reduced amplitudes is applied to the sequence of $n$ gain factors such that the product of the peak pulse amplitude of a transmitted reference pulse multiplied by the reference gain factor $X_0$ is applied, less the predetermined reference value, to the reference gain factor $X_0$.

6. A data transmission system for transmitting data pulses at the regular rate of one pulse each T seconds, said system comprising:
- a transmitter for transmitting approximately symmetrical data pulses once every T seconds and for simultaneously transmitting a sine wave pilot tone with a frequency of $1/2T$, said pilot tone being about a quarter cycle out of phase with the data pulses,
- a connecting link having an association with the equipment at the transmitter and at the receiver and the characteristics of a low pass filter,
- a receiver for receiving said transmissions,
- a sampler for sampling the received amplitude of said pulse transmissions,
- timing means controlling the operation of said sampler such that the sampler output represents the amplitude of the output at the approximate times when the pilot tone at the receiver changes from one polarity to the other,
- an equalizer for receiving the sampler outputs and compensating them for distortion incurred during transmission.

7. A data transmission system including an adaptive equalizer for transmitting pulse signals at a regular rate of one pulse each T seconds over a connecting link such as a telephone, cable or similar circuits which comprises:
- input means for receiving data signals to be transmitted,
- scrambling means for randomizing said data signals so that they will have a predeterminable approximate average value and be random relative to a series of reference pulses,
- transmitting means for transmitting said data signals as amplitude modulated pulses over a connecting link and for concurrently therewith transmitting a reference pulse amplitude once every $k$ T seconds,
- means for adjusting a sequence of amplitude outputs received from the connecting link by a sequence of gain factors, one of which is a reference gain factor $X_0$, each output in the sequence of outputs being adjusted every T seconds by successive gain factors in said sequence of gain factors for $n$ times and all the outputs in the sequence of outputs received in the last $n$ T seconds being adjusted by a gain factor in T seconds to provide $n$ amplitude adjusted outputs each T seconds,
- means for summing the amplitude adjusted outputs each T seconds,
- means for generating small correction factors dependent upon each of the main reference pulse components of each of the summed amplitude adjusted outputs,
- means for applying the correction factors to vary the gain factors, each correction factor being applied to vary that gain having been used to adjust the main received reference pulse component on which that correction factor depends, except that the correction factor applied to the reference gain factor $X_0$ is lessened by a predetermined amount before it is applied to significantly change the reference gain factor.

8. The data transmission system of claim 7 including means to proportionally reduce said correction factors before applying said correction factors to vary the gain factors so that no significant adjustment will be made to any gain factor except over a period sufficiently long for the data components in the summed amplitude adjusted outputs to have averaged to a predetermined value so that the significant adjustments that are made to any gain factor are not based on the data component since it will have either averaged out to zero or to a predetermined value which can be subtracted from the correction factors before they are used to make a significant adjustment to the gain factors.

9. The data transmission system of claim 7 in which said small correction factors vary in direct proportion with the amplitude of the main reference pulse components in the summed amplitude adjusted outputs on which they are dependent.

10. The data transmission system of claim 7 in which $k$ is equal to or larger than $n$ so that there is never more than one main reference pulse component in each summed amplitude adjusted output and in which said means for applying the correction factors to vary the gain factors consists essentially of a series to parallel converter for applying the correction factors to the sequence of gain factors in the order of which they are received and synchronization means so that the correction factor dependent upon the summed amplitude adjusted output that has been adjusted by the reference gain factor $X_0$ is applied to adjust the reference gain factor $X_0$.

11. The data system of claim 10 in which the small correction factors are stored for a period of time sufficient to allow the data to average and for then applying the sum of the stored correction factors to adjust the gain factors.

12. A data transmission system including an adaptive equalizer for transmitting amplitude modulated data pulses at a periodicity of T seconds over a low pass filter, one of the portions of said filter being a telephone or cable circuit, said system comprising:
- a means for receiving and scrambling a series of data pulses so that over a period of time they will average to a predeterminable approximate value,
- means for transmitting said scrambled data pulses with periodicity of T seconds into said low pass filter,
- means for simultaneously transmitting reference pulses of known value into said low pass filter, said reference pulse being transmitted with every $k$th data pulse, the reference pulses being separated sufficiently so that their interference with one another is negligible,
- sampling means for sampling the output from said low pass filter once every T seconds,
- sample storage means for holding a plurality of $n$ of said samples, each sample being held for approximately $n$ T seconds,
- gain factor storage means for holding a plurality of $n$ gain factors, one of said gain factors being a reference gain factor, $X_0$,
- multiplier means for multiplying the sequence of samples held in the sample storage means by the sequence of gain factors held in the gain factor storage means once every T seconds,
- storage and adder means for summing the multiplier product once every T seconds to give a sequence of multiplier sums, providing an equalized output,
- connecting means for applying a portion of each of said multiplier sums to the gain factors in the gain storage unit as a correction, except that the proportion of the multiplier sum to be applied to the reference gain factor $X_0$ is first diminished by a predetermined reference value,
- synchronization means to control said connecting means so that the multiplier sum which contains the product of the peak test pulse times the reference gain factor $X_0$ is applied, proportionally reduced and less the predetermined diminishing value, to the gain factor $X_0$,
- means for subtracting the reference pulse amplitudes from the equalized output, and
- means for descrambling the data.

13. A data transmission system including an adaptive equalizer for transmitting data pulses at a regular rate of one pulse each T seconds which comprises:
- a transmitter adapted to transmit data pulses once every T seconds and two-level sequence reference pulses once every T seconds, the two-level sequence having a period of $k$T and the data and reference pulses being transmitted synchronously and, at the receiver, a sampler adapted to sample the combined data and reference pulses as received at said receiver once each T seconds to provide an uncorrected pulse value each T seconds, an analog-to-digital converter for encoding each of said uncorrected pulse values as an uncorrected number, a recirculating sample memory unit for storing $n$ of said uncorrected numbers, $n$ being equal to or less than $k$, the oldest uncorrected number being replaced by the most recent uncorrected number once each T seconds, a recirculating gain memory unit for retaining a sequence of $n$ gain numbers, said gain numbers having a negative to positive range, first multiplier means for multiplying each of the $n$ uncorrected numbers in said sample memory unit by a separate one of the $n$ gain numbers in said gain memory unit each T seconds to provide $n$ gain modified uncorrected numbers each T seconds, adder means for adding $n$ gain modified numbers each T seconds to provide a single compensation corrected number once each T seconds, a fast two-level sequence generator to generate $n$ pulses of the two-level sequence identical to that generated at the transmitter within each T seconds, second multiplier means for multiplying each of said compensation corrected numbers by each and every one of the $n$ pulses of the two-level sequence each T seconds to provide a sequence of $n$ updating values each T seconds, updating adder means to apply separate ones of said sequence of $n$ updating values to separate ones of said sequence of $n$ gain values in said recirculating gain memory unit to modify said gain values in direct proportion to the magnitude of the reference pulse components of the one of said updating values applied, except that the updating value applied to the reference gain value $X_0$ is lessened by a predetermined value before being applied to modify that said reference gain value, synchronization means such that the updating value that is the product of a particularly positioned pulse in the two-level sequence multiplied by a compensation corrected number is applied to adjust that gain which was multiplied by the uncorrected number that corresponds to the received peak of the same particularly positioned pulse in the two-level sequence.

14. The data transmission system of claim 13 in which the synchronization means include means to advance the sequence of $n$ pulses of the two-level sequence produced within T seconds by the fast two-level generator by one pulse each T seconds so that the position of the first pulse produced by the fast two-level sequence generator is synchronous with and in phase with the position of the peak received reference pulse which is in the most recently stored uncorrected number.

15. The data transmission system of claim 13 in which the synchronization means includes means to adjust the phasing of the two-level sequence supplied by the fast two-level generator so that the appropriately particularly positioned pulse in the fast two-level sequence is multiplied by the appropriate compensation corrected number which includes:

means for detecting the gain to which the $X_0$ adjustments are being made, means for measuring the amount of delay required in the supply of this adjustment to the updating adder in order that the adjustment may be supplied by the updating adder to the reference gain in the recirculating gain memory, means to interrupt and thus delay the fast two-level sequence by this period, and means to restart the fast two-level sequence at the end of said period of delay.

16. A digital tapped delay line comprising:

a first recirculating memory for storing $n$ samples $Y_i$, each sample $Y_i$ having as a component a received peak from a differently positioned reference value from a two-level sequence of reference values of a period of at least $n$ pulses, a second recirculating memory for storing $n$ gain factors $X_i$, one of said gain factors being a reference gain factor $X_0$, and means for subtracting an amplitude reference value from adjustments made to the reference gain factor $X_0$, an updating adder for recirculating the gain factors from one end to the other of the first recirculating memory and for making adjustments to them at the same time, a first digital multiplier for multiplying each sample by a different gain factor each T seconds to produce a sequence of $n$ multiplier outputs $X_i Y_i$ each T seconds, an adder for adding $n$ of the multiplied products together each T seconds to provide a single output $Z_i$, a fast two-level sequence generator to generate $n$ pulses $M_i$ of the two-level sequence within each T seconds, second multiplier means for multiplying each of the pulses in the fast two-level sequence by each output $Z_i$ to produce $n$ outputs $M_i Z_i$ each T seconds, and means for supplying the series of outputs $M_i Z_i$ to the updating adder for adding them as adjustments to the gain factors, synchronization means for maintaining the operation of the above-identified components.

17. The digital tapped delay line of claim 16 in combination with an initial synchronization subsystem comprising:

a gain factor source for receiving the recirculated gain factors from the updating adder and for either adding them back into the recirculating gain memory or for substituting for them preset gains, one of said preset gains being of substantial value and applying in the place of a known gain factor and the other of said preset gains being of substantially less value, and simultaneously interrupting the subtracting of an amplitude reference value from the adjustments made to the gain factor $X_0$, an AND gate means for observing the sum of the adjustments being supplied by the updating adder for adjustment of the gain factors and for signaling the gain factor for which adjustments have been accumulated to a threshold value, said adjustments being those which could be supplied to correct the gain factor to which said substantial value was applied by the gain factor source, that being the one for which adjustment will accumulate the fastest, means for delaying the fast two-level sequence by time equivalent to the number of pulses in the sequence corresponding by the number of gain factors by which the accumulating adjustment must be delayed to be applied to the gain factor to which the substantial preset value is applied.

References Cited

UNITED STATES PATENTS

| | | | |
|---|---|---|---|
| 3,283,063 | 11/1966 | Kawashima et al. | |
| 3,305,798 | 2/1967 | Rappeport | 333—18 |
| 3,356,955 | 12/1967 | Mohn et al. | 328—163 X |
| 3,368,168 | 2/1968 | Lucky | 333—18 |
| 3,375,473 | 3/1968 | Lucky | 333—18 |

ROBERT L. GRIFFIN, *Primary Examiner.*

J. A. BRODSKY, *Assistant Examiner.*

U.S. Cl. X.R.

325—65; 328—163; 333—18